US012738572B2

(12) United States Patent
Norimine et al.

(10) Patent No.: US 12,738,572 B2
(45) Date of Patent: Sep. 15, 2026

(54) ENERGY STORAGE APPARATUS AND ENERGY STORAGE MODULE

(71) Applicant: Panasonic Intellectual Property Management Co., Ltd., Osaka (JP)

(72) Inventors: Shota Norimine, Osaka (JP); Hirotaka Ogino, Osaka (JP); Shinya Geshi, Osaka (JP); Toshiya Gotou, Osaka (JP); Shoichiro Watanabe, Nara (JP); Shingo Kume, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 890 days.

(21) Appl. No.: 18/018,509

(22) PCT Filed: Jul. 29, 2021

(86) PCT No.: PCT/JP2021/028107
§ 371 (c)(1),
(2) Date: Jan. 27, 2023

(87) PCT Pub. No.: WO2022/025186
PCT Pub. Date: Feb. 3, 2022

(65) Prior Publication Data

US 2023/0291038 A1 Sep. 14, 2023

(30) Foreign Application Priority Data

Jul. 30, 2020 (JP) ................................ 2020-129061
Sep. 30, 2020 (JP) ................................ 2020-164622

(51) Int. Cl.
*H01M 50/105* (2021.01)
*H01G 11/10* (2013.01)
(Continued)

(52) U.S. Cl.
CPC .......... *H01M 50/105* (2021.01); *H01G 11/10* (2013.01); *H01G 11/26* (2013.01);
(Continued)

(58) Field of Classification Search
CPC ............. H01M 50/105; H01M 50/184; H01M 50/186; H01M 50/291; H01M 50/538;
(Continued)

(56) References Cited

U.S. PATENT DOCUMENTS 9,065,103 B2 6/2015 Straubel et al.
9,502,700 B2 11/2016 Haussman
(Continued)

FOREIGN PATENT DOCUMENTS

EP 1990860 A1 11/2008
JP 2003-017014 A 1/2003
(Continued)

OTHER PUBLICATIONS

International Search Report issued in corresponding International Application No. PCT/JP2021/028107, dated Oct. 19, 2021, with English translation.
(Continued)

*Primary Examiner* — Kevin P Kerns
(74) *Attorney, Agent, or Firm* — RIMON P.C.

(57) ABSTRACT

An energy storage apparatus includes: a plurality of electrode assemblies that are cylindrical, and a film outer body including a plurality of housing portions that individually wrap the plurality of electrode assemblies; and a sealing portion that seals each housing portion and connects the plurality of housing portions to each other. The film outer body is bent or curved between the housing portions adjacent each other to extend in a zigzag manner.

4 Claims, 19 Drawing Sheets

(51) Int. Cl.

| | |
|---|---|
| ***H01G 11/26*** | (2013.01) |
| ***H01G 11/78*** | (2013.01) |
| ***H01G 11/80*** | (2013.01) |
| ***H01M 50/184*** | (2021.01) |
| ***H01M 50/186*** | (2021.01) |
| ***H01M 50/291*** | (2021.01) |
| ***H01M 50/538*** | (2021.01) |

(52) U.S. Cl.

CPC ............. *H01G 11/78* (2013.01); *H01G 11/80* (2013.01); *H01M 50/184* (2021.01); *H01M 50/186* (2021.01); *H01M 50/291* (2021.01); *H01M 50/538* (2021.01)

(58) Field of Classification Search

CPC ........ H01G 11/10; H01G 11/26; H01G 11/78; H01G 11/80

USPC ............................................................ 429/94

See application file for complete search history.

(56) References Cited

U.S. PATENT DOCUMENTS

| | | | |
|---|---|---|---|
| 10,516,141 | B2 | 12/2019 | Minamitani |
| 2007/0009787 | A1 | 1/2007 | Straubel et al. |
| 2008/0305388 | A1 | 12/2008 | Haussman |
| 2011/0020678 | A1 | 1/2011 | Straubel et al. |
| 2014/0178722 | A1 | 6/2014 | Straubel et al. |
| 2015/0244047 | A1 | 8/2015 | Straubel et al. |
| 2016/0248052 | A1 | 8/2016 | Minamitani |
| 2020/0052260 | A1 | 2/2020 | Fees et al. |
| 2020/0112000 | A1 | 4/2020 | Kwag |

FOREIGN PATENT DOCUMENTS

| | | | |
|---|---|---|---|
| JP | 2010-108794 | A | 5/2010 |
| JP | 2014-170613 | A | 9/2014 |
| JP | 2015-185295 | A | 10/2015 |
| JP | 2016-157518 | A | 9/2016 |
| WO | 2006/124663 | A2 | 11/2006 |

OTHER PUBLICATIONS

Extended European Search Report issued for corresponding EP Application No. 21849352.6, dated Jan. 16, 2024.

A
B
C
8
10
12
14
4
14a
14b
1

4
12
14
8
14a
14b
θ
A
B
C
1
16
2
10

A
B
C
104,118
104,120
1
10
14
14
12
4
126
108
124
100

A
B
C
26
8
4
14
12
2
28
30
1

A
B
C
26
26
8
10
12
14
4
28
30
1

ENERGY STORAGE APPARATUS AND ENERGY STORAGE MODULE

CROSS-REFERENCE TO RELATED APPLICATIONS

This application is the U.S. National Phase under 35 U.S.C. § 371 of International Patent Application No. PCT/JP2021/028107, filed on Jul. 29, 2021, which in turn claims the benefit of Japanese Patent Application No. 2020-129061, filed on Jul. 30, 2020, and Japanese Patent Application No. 2020-164622, filed on Sep. 30, 2020, the entire content of each of which is incorporated herein by reference.

BACKGROUND

Field of the Invention

The present disclosure relates to an energy storage apparatus and an energy storage module.

Description of the Related Art

Energy storage modules on which a plurality of cylindrical energy storage apparatuses (for example, batteries) is mounted (see, for example, Patent Literature 1) have conventionally been known. In the energy storage module disclosed in Patent Literature 1, each energy storage apparatus includes a cylindrical outer can, and a wound-type electrode assembly is housed in the outer can.

Patent Literature 1: JP 2014-170613 A

An energy storage module may be used as a power source for a vehicle or a mobile terminal. Thus, reducing the weight of an energy storage module has been demanded. As a method for reducing the weight of an energy storage module, it is conceivable to wrap a plurality of electrode assemblies with a common film outer body while maintaining individual sealing property thereof. Accordingly, an energy storage apparatus having a plurality of electrode assemblies can be obtained. In this case, since outer cans that house the electrode assemblies can be eliminated, the weight of the energy storage module can be reduced.

In a case where the plurality of electrode assemblies is sealed with the film outer body, in order to ensure the safety and the power generation performance of the energy storage module, high sealing property of each electrode assembly is demanded. In order to obtain the high sealing property of each electrode assembly, it is desirable to surround housing portions of the electrode assemblies with a sealing portion having a large area. However, in a case where the area of the sealing portion is large, the interval between the adjacent electrode assemblies is widened, and then the outer dimension of the energy storage apparatus is increased. This may reduce the energy density of the energy storage module.

SUMMARY OF THE INVENTION

The present disclosure has been made in view of such a situation, and one of the objects of the present disclosure is to provide a technique for improving energy density of an energy storage module while suppressing decrease in sealing property of electrode assemblies.

One aspect of the present disclosure is an energy storage apparatus. The energy storage apparatus includes a plurality of electrode assemblies that are cylindrical, and a film outer body including a plurality of housing portions that individually wrap the plurality of electrode assemblies, and a sealing portion that seals each housing portion, and connects the plurality of housing portions to each other. The film outer body is bent or curved between the housing portions adjacent each other to extend in a zigzag manner.

Another aspect of the present disclosure is an energy storage module. The energy storage module includes the plurality of energy storage apparatuses of the above aspect and a holder that holds the plurality of energy storage apparatuses.

Still another aspect of the present disclosure is an energy storage apparatus. The energy storage apparatus includes a plurality of electrode assemblies that are cylindrical, and a film outer body including a plurality of housing portions that individually wrap the plurality of electrode assemblies, and a sealing portion that seals each housing portion and connects the plurality of housing portions to each other. The film outer body is bent between the housing portions adjacent each other to meander in an arrangement direction of the electrode assemblies. The sealing portion includes first connectors and second connectors that are arranged between adjacent two of the housing portions and connect the two housing portions, and an outer edge extending over the plurality of housing portions on the outer side with respect to the housing portions in an axial direction of the electrode assemblies. The first connectors and the second connectors are alternately arranged in the arrangement direction of the electrode assemblies, and extend in the arrangement direction while being shifted from each other in an orthogonal direction that is orthogonal to the axial direction and the arrangement direction. The outer edge includes a first inclined portion that is continuous from one of the first connectors and the housing portions, that is bent, with respect to a connection portion between the first connector and the housing portions, to a side of the second connectors in the orthogonal direction, and that includes a valley fold fitted between the housing portions adjacent each other, and a second inclined portion that is continuous from one of the second connectors and adjacent two of the first inclined portions arranged with the second connector interposed therebetween, and that is bent, with respect to a connection portion between the second connector and the two first inclined portions, to a side of the first connectors in the orthogonal direction. The first inclined portion and the second inclined portion overlap each other on the housing portions as viewed from the axial direction to form an overlapping portion.

Any combination of the above components, and modifications of the expressions of the present disclosure between methods, apparatuses, systems, and the like are also effective as aspects of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
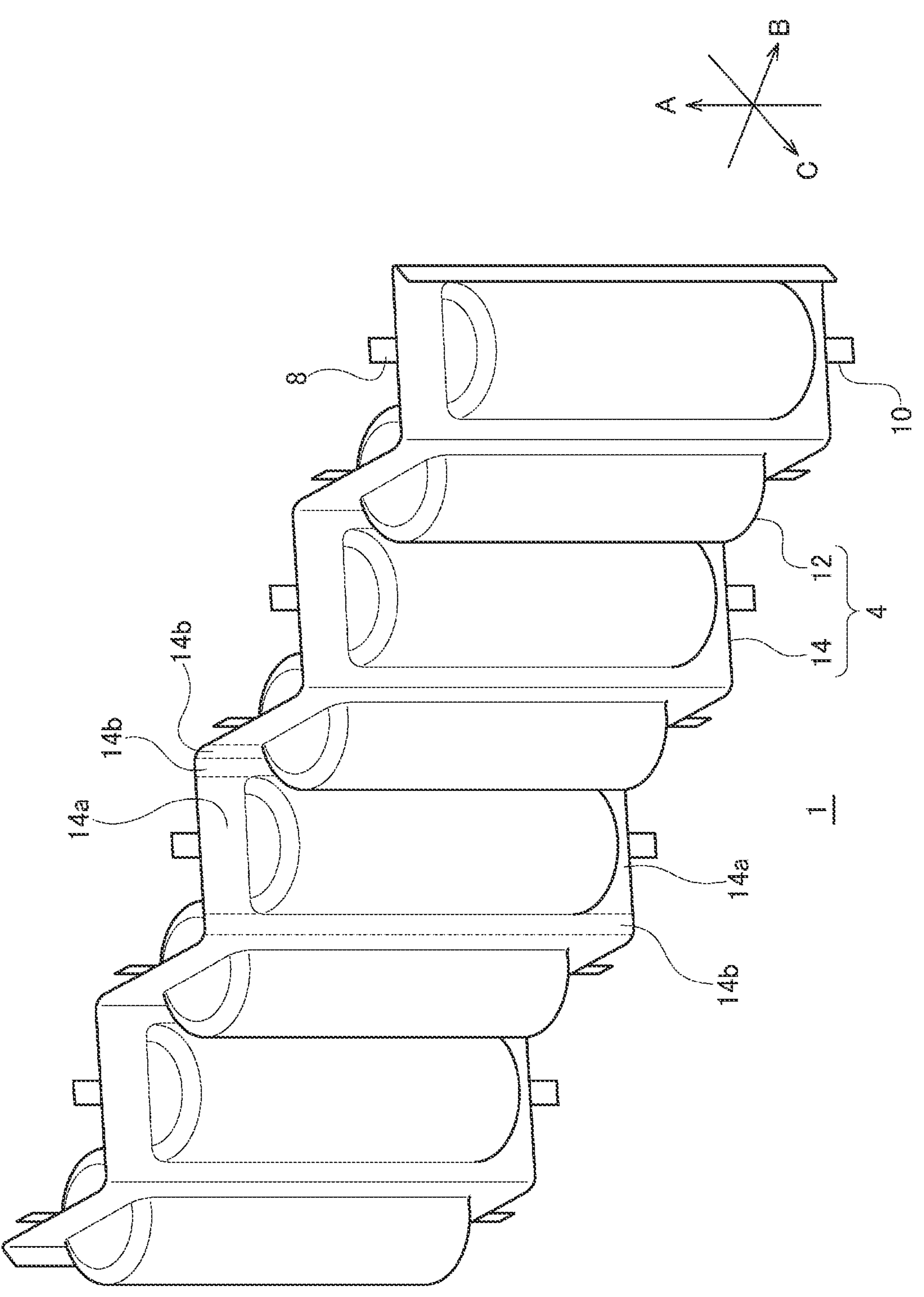
FIG. 1 is a perspective view of an energy storage apparatus according to a first embodiment.

Hereinafter, the present disclosure will be described based on preferred embodiments with reference to the drawings. The embodiments are not intended to limit the present disclosure, but are exemplary, and all features and combinations thereof described in the present embodiments are not necessarily essential to the present disclosure. The same or equivalent components, members, and processes illustrated in the drawings are denoted by the same reference signs, and redundant description is omitted as appropriate.

The scale and shape of each part illustrated in the drawings are set for convenience in order to facilitate description, and are not limitedly interpreted unless otherwise specified. When the terms such as "first" and "second" are used in the present description or claims, unless otherwise specified, these terms do not represent any order or importance, and are intended to distinguish one component from another component. In each drawing, some of members that are not important for describing the embodiment are omitted.

First Embodiment

Figures 2A, 2B:
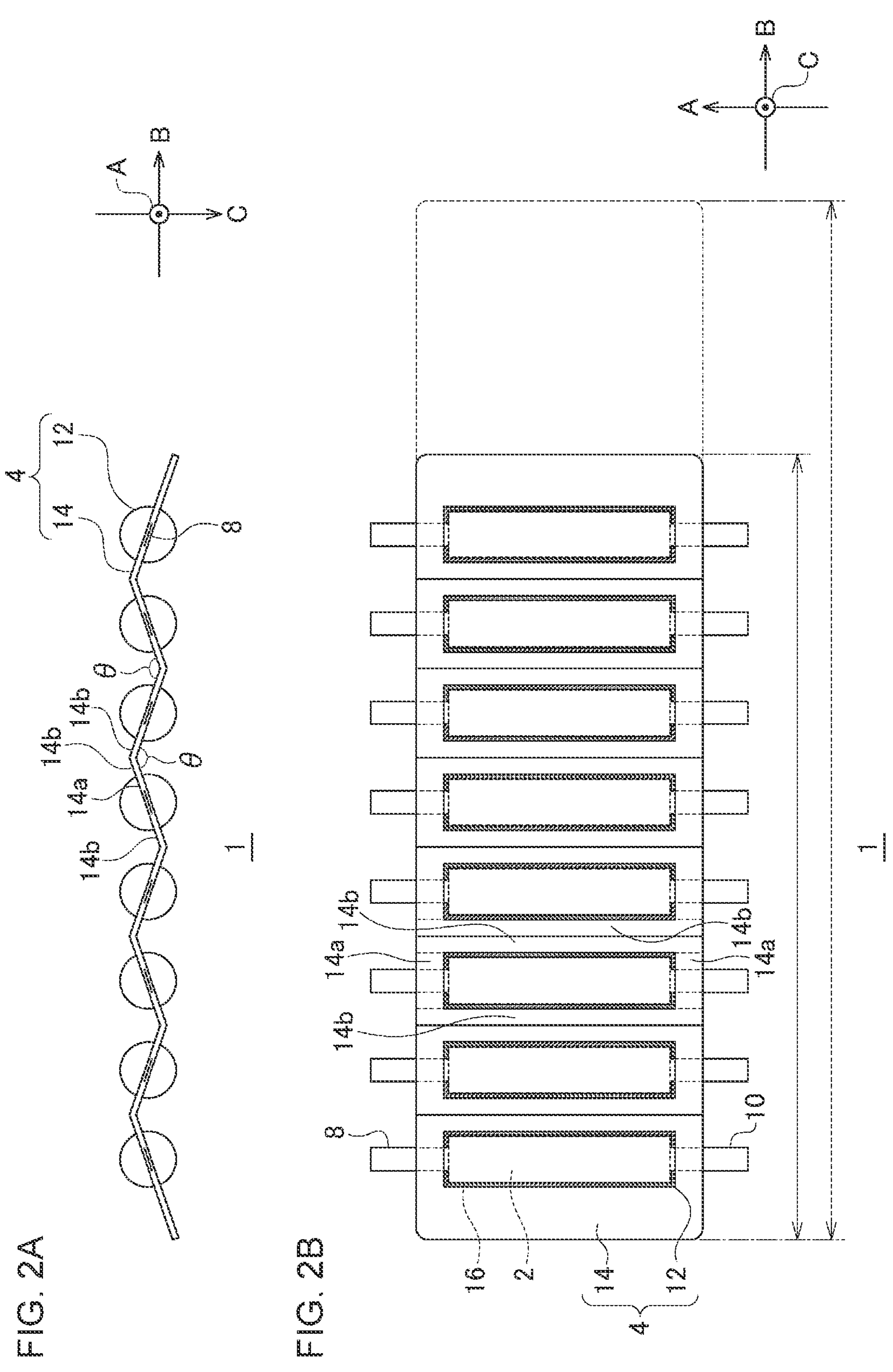
FIG. 2A is a schematic view of the energy storage apparatus as viewed in an axial direction.
FIG. 2B is a schematic view of the energy storage apparatus as viewed in a second direction.

FIG. 1 is a perspective view of an energy storage apparatus 1 according to a first embodiment. FIG. 2A is a schematic view of the energy storage apparatus 1 as viewed in an axial direction A. FIG. 2B is a schematic view of the energy storage apparatus 1 as viewed in a second direction C. In FIG. 2B, the inside of a film outer body 4 is also illustrated for convenience of description. In addition, a state before the film outer body 4 is folded is illustrated by a broken line. In the present embodiment, a direction in which an axis of the spiral of the electrode assembly 2 extends is defined as the axial direction A, a direction in which the plurality of electrode assemblies 2 is arranged is defined as a first direction B (in the present disclosure, also referred to as an arrangement direction B), and a direction orthogonal to the axial direction A and the first direction B is defined as the second direction C (in the present disclosure, also referred to as an orthogonal direction C).

The energy storage apparatus 1 of the present embodiment is, for example, a chargeable secondary battery such as a lithium-ion battery, a nickel-hydrogen battery, or a nickel-cadmium battery, or a capacitor such as an electric double layer capacitor. The energy storage apparatus 1 includes the plurality of electrode assemblies 2 and a film outer body 4. Although the energy storage apparatus 1 of the present embodiment includes the eight electrode assemblies 2, the number of the electrode assemblies 2 is not particularly limited, and it is only required to be two or more.

Each electrode assembly 2 is cylindrical, and has a wound-type structure in which a first electrode plate having a strip shape and a second electrode plate having a strip shape are laminated with an interelectrode separator interposed therebetween and are spirally wound. As an example, the first electrode plate is a negative electrode plate, and the second electrode plate is a positive electrode plate. A first electrode lead 8 is electrically connected to the first electrode plate. A second electrode lead 10 is electrically connected to the second electrode plate. For example, the first electrode lead 8 and the second electrode lead 10 have a strip shape, and one end of each of the leads is welded to the corresponding electrode plate. The plurality of electrode assemblies 2 is set in posture such that the axial directions A of the electrode assemblies 2 are parallel to each other, and is arranged in the first direction B at predetermined intervals. The plurality of electrode assemblies 2 is wrapped in the film outer body 4 that is common.

The film outer body 4 has, for example, a structure in which two laminating films are laminated. Each laminating film has, for example, a structure in which thermoplastic resin sheets are laminated on both surfaces of a metal sheet such as aluminum. The film outer body 4 includes a plurality of housing portions 12 and a sealing portion 14. The plurality of housing portions 12 is arranged in the first direction B at predetermined intervals. Each housing portion 12 is cylindrical, and wraps and houses each electrode assembly 2 therein. Each housing portion 12 is formed from a bag portion provided in the film outer body 4. The bag portion is a portion where two laminating films are separated from each other. Accordingly, each housing portion 12 protrudes from the sealing portion 14 along the shape of the side surface of each of the electrode assemblies 2. That is, each housing portion 12 bulges in a thickness direction of the film outer body 4. Electrolytic solution 16 is housed in each housing portion 12 together with each electrode assembly 2.

The sealing portion 14 surrounds the outer periphery of each housing portion 12 to seal the housing portion 12. The sealing portion 14 is formed from, for example, a welded portion of thermoplastic resin sheets. The welded portion is obtained by subjecting the outer periphery of the bag portions of the film outer body 4 to a thermocompression bonding treatment, and welding each thermoplastic resin sheet of the two laminating films to each other. The sealing portion 14 seals each housing portion 12 and connects the plurality of housing portions 12 to each other.

Each end of the first electrode lead 8 and the second electrode lead 10 on the opposite side to the side connected to the electrode assembly 2 protrudes to the outside of the film outer body 4. Boundary faces between each electrode lead and the film outer body 4 are sealed with known sealant. In the present embodiment, the first electrode lead 8 and the second electrode lead 10 connected to each electrode assembly 2 protrude in the opposite orientations of the axial direction A. Each of the first electrode leads 8 protrudes in the same orientation. Note that the first electrode lead 8 and the second electrode lead may protrude in the same orientation of the axial direction A.

The film outer body 4 is bent or curved between the housing portions 12 that are adjacent each other to extend in a zigzag manner. That is, the film outer body 4 meanders in the first direction B. By folding the film outer body 4 in a zigzag manner, intervals between individual housing portions 12 in the first direction B can be narrowed as compared with a state before the film outer body 4 is folded, and hence a length of the energy storage apparatus 1 in the first direction B can be shorter. In addition, the plurality of housing portions 12 of the present embodiment is, in a state where the film outer body 4 extends in a zigzag manner, arranged such that individual centers thereof are arranged on the same straight line as viewed from the axial direction A. Accordingly, it is possible to suppress increase in size of the energy storage apparatus 1 in the second direction C as compared with a case where the plurality of housing portions 12 is arranged such that individual centers thereof are shifted in the second direction C. In addition, each housing portion 12 of the present embodiment protrudes outward in the second direction C from the sealing portion 14 that is bent in a zigzag shape. In other words, the sealing portion 14 that is bent in a zigzag shape is arranged on the inner side with respect to the housing portions 12 in the second direction C. Accordingly, it is possible to reduce the size of the energy storage apparatus 1 in the first direction B while further suppressing increase in size of the energy storage apparatus 1 in the second direction C by folding the film outer body 4. Note that the centers of the plurality of housing portions 12 are not necessarily arranged on the same straight line in the present disclosure.

Specifically, the sealing portion 14 includes a pair of first sides 14*a* and a pair of second sides 14*b* surrounding the periphery of each housing portion 12. Each pair of first sides 14*a* is arranged in parallel to the axial direction A with the corresponding housing portion 12 interposed therebetween, and seals ends of the corresponding housing portion 12 in the axial direction A. The first sides 14*a* of the present embodiment extend linearly through the centers of the housing portions 12 as viewed from the axial direction A. Each pair of second sides 14*b* is arranged in parallel to a direction orthogonal to the axial direction A with the corresponding housing portion 12 interposed therebetween, and extends in the axial direction A to connect the corresponding pair of first sides 14*a*.

Two of the second sides 14*b* located between adjacent two of the housing portions 12 are connected to each other at a predetermined angle θ, that is, non-linearly. A plurality of connection portions arranged in the first direction B, each of which connects the two second sides 14*b*, are bent or curved in opposite directions alternately. Consequently, the film outer body 4 extends in a zigzag manner in the first direction B. When the connection portions are curved, an angle θ formed by the two second sides 14*b* is, for example, an angle at which an extended line of the first side 14*a* corresponding to (in contact with) one housing portion 12 intersects an extended line of the first side 14*a* corresponding to the other housing portion 12.

Preferably, the connection portions are curved. This can suppress decrease in sealing property of each housing portion 12 due to breakage of the film outer body 4 or peeling off the two laminating films at the connection portions. Preferably, the film outer body 4 is bent or curved such that two of the first sides 14*a* corresponding to adjacent two of the housing portions 12 extend in directions intersecting each other. That is, the bending amount (angle amount) or the curving amount (angle amount) of the two second sides 14*b* from the linear state is less than 180°, and the adjacent two first sides 14*a* extend non-parallel to each other.

Accordingly, as compared with the case where the connection portions are bent or curved such that the two first sides 14*a* are arranged parallel, it is possible to easily prevent the sealing portion 14 from protruding outward from the housing portions 12 in the second direction C. Alternatively, the protruding amount of the sealing portion 14 can be reduced. Thus, it is possible to suppress increase in size of the energy storage apparatus 1 in the second direction C. More preferably, the angle θ formed by the two second sides 14*b* is an obtuse angle (more than 90° and less than 1800). In other words, the bending amount (angle amount) or the curving amount (angle amount) is more than 0° and less than 90°. Accordingly, stress applied to the connection portions can be reduced. Thus, it is possible to suppress the decrease in sealing property of each housing portion 12 due to breakage of the sealing portion 14 or peeling off the two laminating films at the connection portions.

Figure 3A:
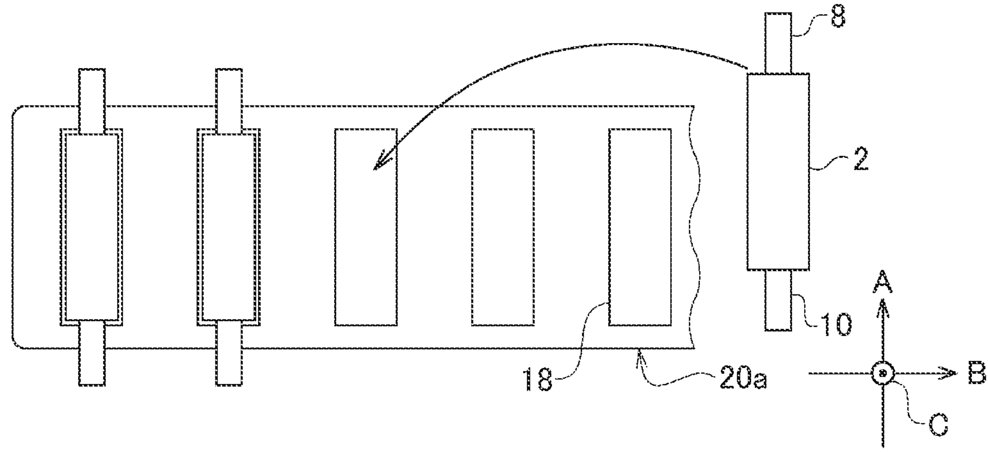
FIGS. 3A-3C are process diagrams of a method for manufacturing the energy storage apparatus.

Hereinafter, an example of a method for manufacturing the energy storage apparatus 1 will be described. FIGS. 3A to 3C and FIGS. 4A to 4C are process diagrams of the method for manufacturing the energy storage apparatus 1. First, as illustrated in FIG. 3A, a first laminating film 20*a* is prepared. A plurality of depressions 18 that are semi-cylindrical is formed in advance in the first laminating film 20*a*. The plurality of depressions 18 is formed, for example, by subjecting the first laminating film 20*a* to known treatment such as press working. One of the electrode assemblies 2 is set in each depression 18. The first electrode lead 8 and the second electrode lead 10 are connected to the electrode assembly 2 in advance. The first electrode lead 8 and the second electrode lead 10 are provided with sealant (not illustrated).

Figure 3B:
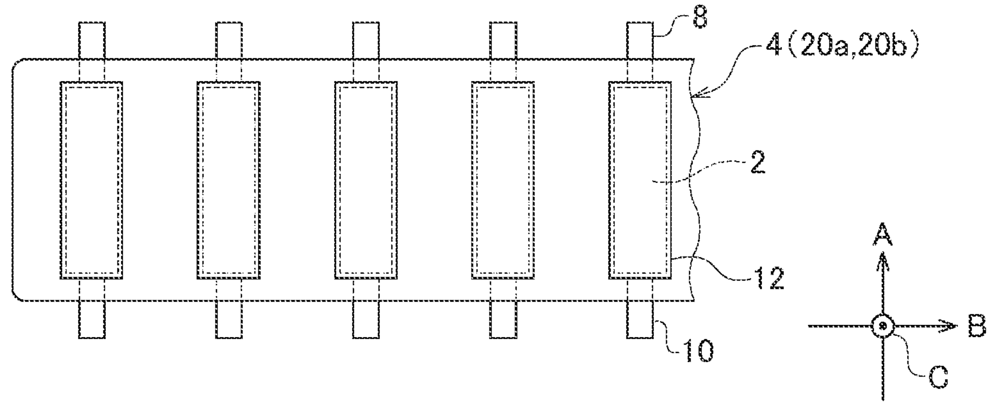

Then, as illustrated in FIG. 3B, a second laminating film 20*b* is made to overlap the first laminating film 20*a* to form the film outer body 4. The second laminating film 20*b* is provided with the depressions 18 that are semi-cylindrical at positions facing the depressions 18 of the first laminating film 20*a*. Accordingly, by making the first laminating film 20*a* and the second laminating film 20*b* overlap each other, the housing portions 12 are formed by pairs of depressions 18. The depressions 18 in the second laminating film 20*b* are formed by a method similar to the method for forming the depressions 18 in the first laminating film 20*a*. In a state where the electrode assemblies 2 are housed in the housing portions 12, the distal ends of the first electrode leads 8 and the distal ends of the second electrode leads 10 protrude to the outside of the film outer body 4.

Figure 3C:
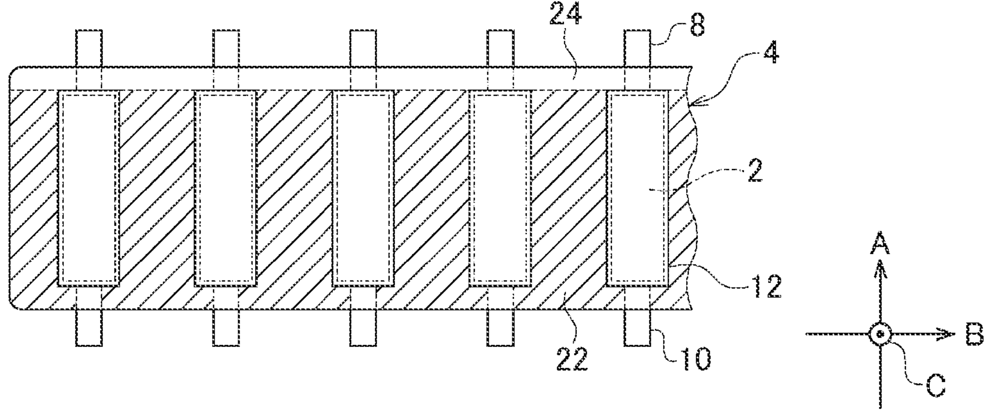

Then, as illustrated in FIG. 3C, a part of the film outer body 4 is subjected to the thermocompression bonding treatment to form a welded portion 22. A portion of the film outer body 4 that is not subjected to the thermocompression bonding treatment is a non-welded portion 24. The non-welded portion 24 is arranged so as to connect each housing portion 12 and the outside of the film outer body 4. In the present embodiment, the non-welded portion 24 is provided so as to connect the side from which the first electrode lead

8 protrudes among the four sides of each housing portion 12 and the outside of the film outer body 4. The other three sides of each housing portion 12 are surrounded by the welded portion 22. Boundary faces between the film outer body 4 and each second electrode lead 10 are sealed with sealant.

Figure 4A:
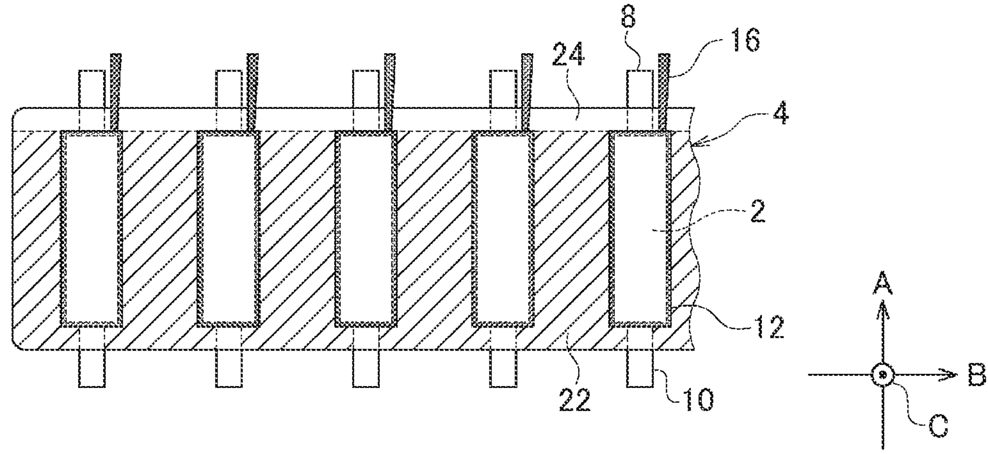
FIGS. 4A-4C are process diagrams of a method for manufacturing the energy storage apparatus.
Figure 4B:
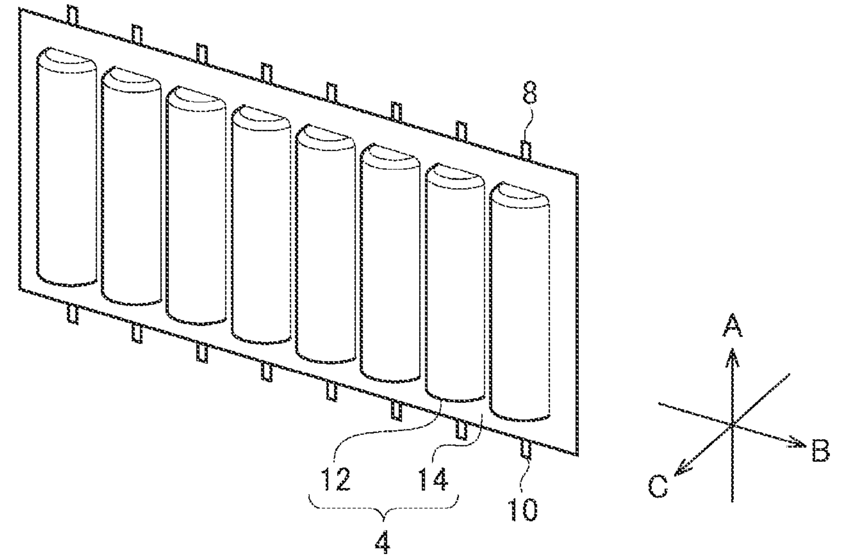
Figure 4C:
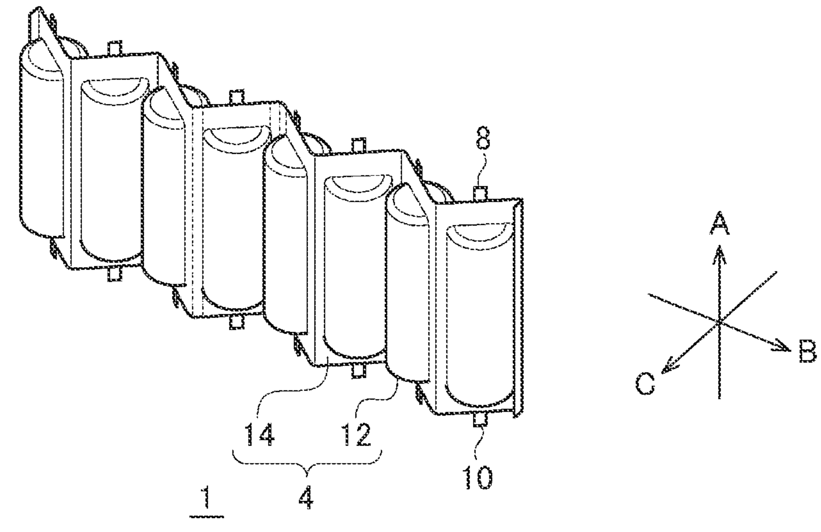

Then, as illustrated in FIG. 4A, the electrolytic solution 16 is injected into each of the housing portions 12 via the non-welded portion 24. After the injection of the electrolytic solution 16, as illustrated in FIG. 4B, the non-welded portion 24 is also subjected to the thermocompression bonding treatment. Consequently, the sealing portion 14 surrounding the entire circumference of each housing portion 12 is formed. Boundary faces between the film outer body 4 and each first electrode lead 8 are sealed with sealant. Then, as illustrated in FIG. 4C, the film outer body 4 is bent in a zigzag shape. Through the above processes, the energy storage apparatus 1 is obtained.

Note that the method for manufacturing the energy storage apparatus 1 is not limited to the method described above. For example, the electrode assemblies 2 may be wrapped by folding one laminating film in half having a length twice as long as that of the energy storage apparatus 1. In a case where the required amount of the electrolytic solution 16 is small, the process of injecting the electrolytic solution 16 illustrated in FIG. 4A can be omitted by infiltrating the electrolytic solution 16 into the interelectrode separator in advance. In this case, in the thermocompression bonding treatment process illustrated in FIG. 3C, the entire circumference of each housing portion 12 is subjected to the thermocompression bonding treatment to form the sealing portion 14.

Figure 5:
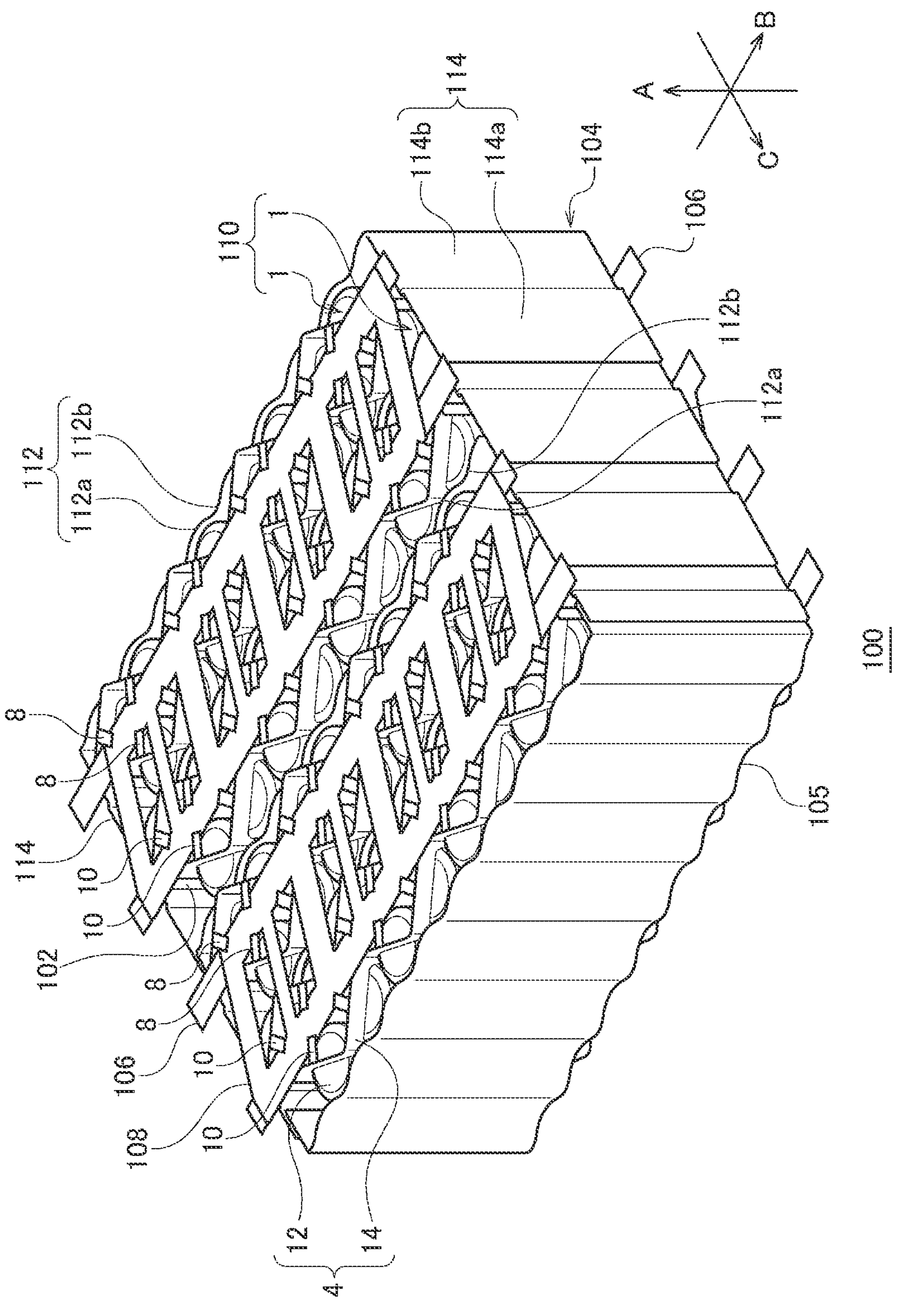
FIG. 5 is a perspective view of an energy storage module according to the first embodiment.
Figure 6:
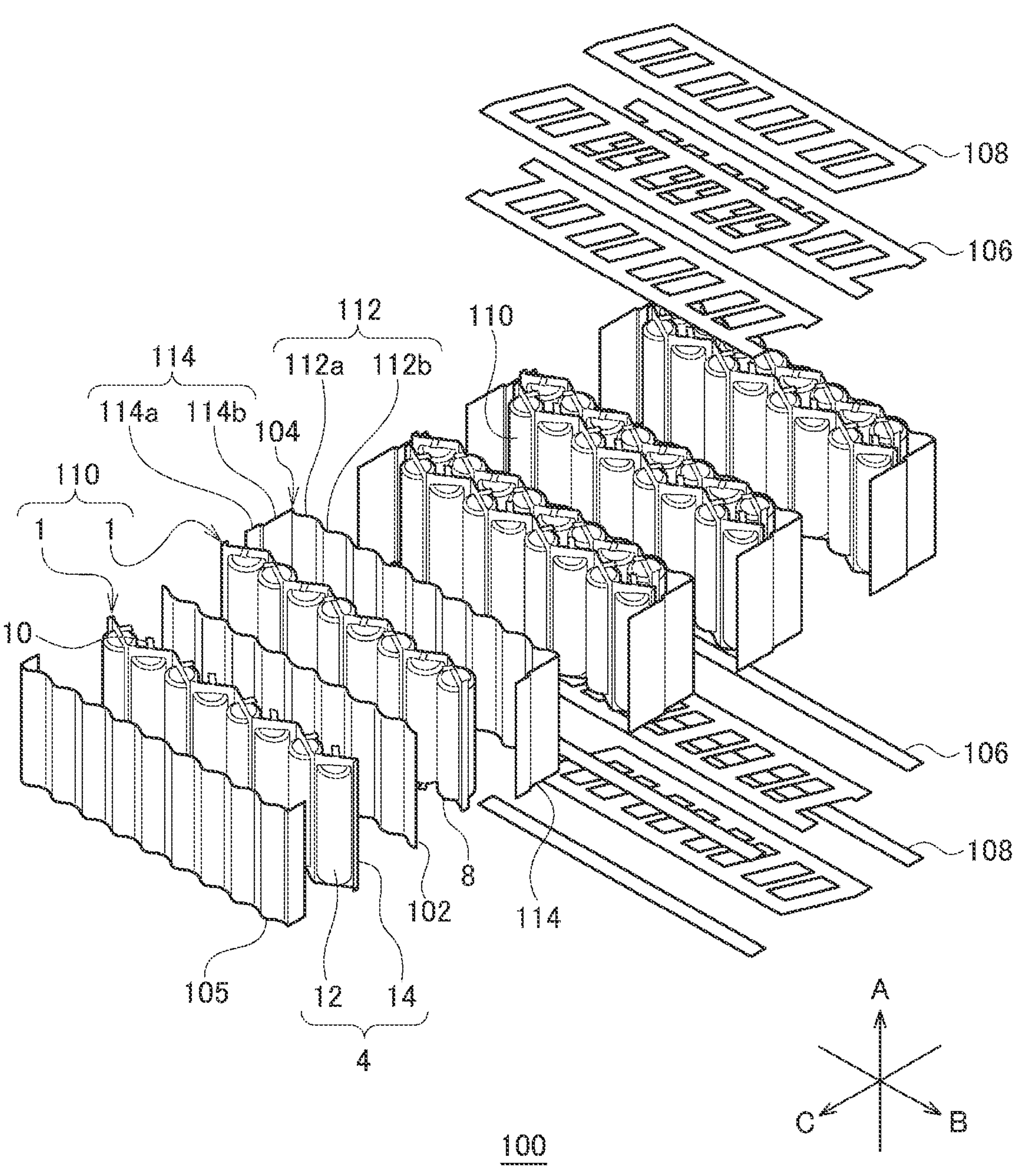
FIG. 6 is an exploded perspective view of the energy storage module.
Figure 7:
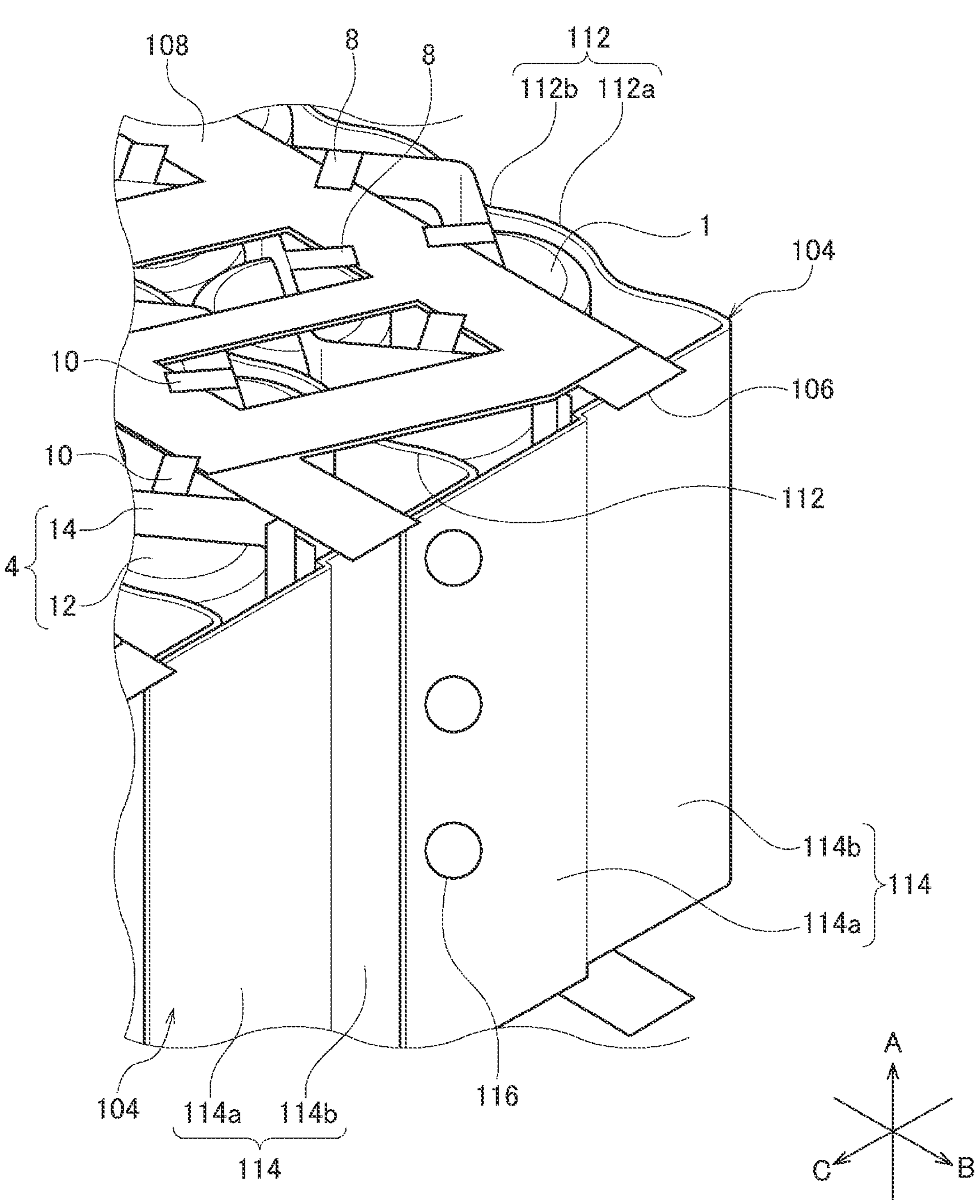
FIG. 7 is an enlarged perspective view illustrating a part of the energy storage module.

The energy storage apparatus 1 of the present embodiment can be incorporated in an energy storage module 100 described below. FIG. 5 is a perspective view of the energy storage module 100 according to the first embodiment. FIG. 6 is an exploded perspective view of the energy storage module 100. FIG. 7 is an enlarged perspective view illustrating a part of the energy storage module 100.

The energy storage module 100 includes a plurality of energy storage apparatuses 1, separators 102, holders 104, insulating plates 106, and bus bars 108. Although the energy storage module 100 of the present embodiment includes the eight energy storage apparatuses 1, the number of the energy storage apparatus 1 is not particularly limited, and it is only required to be two or more.

The plurality of energy storage apparatuses 1 is set in posture such that the individual housing portions 12 are arranged in the same direction, and the energy storage apparatuses 1 are arranged in the second direction C. The plurality of energy storage apparatuses 1 is divided in pairs into units 110. The number of energy storage apparatuses 1 included in each unit 110 is not limited to two.

In each unit 110, the two energy storage apparatuses 1 are arranged to be shifted from each other in the first arrangement direction B such that, between the axes of adjacent two of the electrode assemblies 2 in one energy storage apparatus 1, the axis of one of the electrode assemblies 2 of the other energy storage apparatus 1 is located. That is, between the valley of two of the housing portions 12 of one energy storage apparatus 1, one of the housing portions 12 of the other energy storage apparatus 1 is fitted. Accordingly, the size of each unit 110 in the second direction C can be reduced.

In each unit 110, the separator 102 is arranged between the two energy storage apparatuses 1. The separator 102 is also referred to as, for example, insulating spacer, and is used for electrically insulating the two adjacent energy storage apparatuses 1 from each other, holding the energy storage apparatuses 1 with which the separator itself is in contact, and absorbing assembly tolerance of the plurality of energy storage apparatuses 1. The separator 102 may have, for example, a corrugated plate shape in which recesses and projections are repeated in the first direction B, or may be a plate member that is thicker than a corrugated plate and provided with a plurality of recesses formed in the first direction B on both surfaces thereof. The separator 102 is formed from, for example, insulating resin. Examples of the resin forming the separator 102 include thermoplastic resin such as polypropylene (PP), polybutylene terephthalate (PBT), polycarbonate (PC), and Noryl (registered trademark) resin (modified-PPE). The separator 102 may be formed from elastic material such as polyurethane, a silica-based heat insulator, or the like. As long as the insulating state between the energy storage apparatuses 1 can be maintained, the separator 102 may be formed from metal such as aluminum, aluminum alloy or steel.

The plurality of energy storage apparatuses 1 is held by the plurality of holders 104. Each holder 104 includes a side plate 112 and a pair of protrusions 114. The side plate 112 is a rectangular plate extending in the first direction B. The pair of protrusions 114 are rectangular plates protruding in the second direction C from both ends of the side plate 112 in the first direction B. The pair of protrusions 114 face each other in the first direction B. Thus, the holder 104 has a substantially U-shape that is long in the first direction B. The holder 104 is set in posture such that the main front surface of the side plate 112 faces the second direction C and the main front surface of each protrusion 114 faces the first direction B.

Each holder 104 is formed from, for example, one plate member. The side plate 112 and the pair of protrusions 114 can be formed by bending both ends of the metal plate. Note that the holder 104 may be made of resin as long as a predetermined or higher rigidity can be obtained. In addition, the holder 104 may be formed by joining the side plate 112 and the protrusions 114, which are separate bodies. Examples of metal used for the holder 104 include aluminum, aluminum alloy, steel, and the like. Examples of the resin used for the holder 104 include thermoplastic resin such as polypropylene (PP), polybutylene terephthalate (PBT), polycarbonate (PC), and Noryl (registered trademark) resin (modified-PPE); Fiber-reinforced plastic (FRP) including carbon fiber-reinforced plastic, glass fiber-reinforced plastic, and the like.

One holder 104 is assembled to one unit 110. Each unit 110 is fenced by the holder 104 on three sides in the first direction B and the second direction C. The side plate 112 covers one surface of the unit 110 in the second direction C. The pair of protrusions 114 cover both surfaces of the unit 110 in the first direction B. As an example, the side plate 112 is fixed to the energy storage apparatus 1 facing the plate with adhesive. The adhesive is preferably insulating adhesive. An insulating sheet (not illustrated) may be interposed between the unit 110 and the holder 104.

The units 110 are arranged in the second direction C with the holders 104 assembled. At this time, the units 110 are arranged such that their exposed surfaces not covered with the holders 104 face the same direction. In a state where the units 110 are arranged, the exposed surface of each unit 110 is covered with the side plate 112 of the holder 104 assembled to the unit 110 adjacent thereto and fixed with adhesive. Accordingly, each unit 110 is arranged between the pair of side plates 112 in the second direction C. The side plate 112 located between two of the units 110 is arranged between two of the energy storage apparatuses 1.

Each protrusion 114 includes a distal end 114*a* and a proximal end 114*b*. The proximal end 114*b* is interposed between the side plate 112 and the distal end 114*a*. The distal end 114*a* is shifted in a direction away from the unit 110 with respect to the proximal end 114*b*. Thus, the interval between the pair of protrusions 114 is larger on the distal end 114*a* side than on the proximal end 114*b* side. Each distal end 114*a* protrudes to a position where the distal end 114*a* overlaps the proximal end 114*b* of the holder 104 adjacent thereto as viewed from the first direction B.

That is, when the plurality of units 110 is arranged in the second direction C, in adjacent two of the holders 104, into the interval between the pair of distal ends 114*a* of one holder 104, the side plate 112 and the pair of proximal ends 114*b* of the other holder 104 enter. Then, a portion where the distal ends 114*a* of one holder 104 and the proximal end 114*b* of the other holder 104 overlap each other is subjected to known joining treatment such as laser welding to form joints 116. Consequently, the holders 104 are connected to each other, and the plurality of energy storage apparatuses 1 are held by the plurality of holders 104.

The side plate 112 has a plurality of recesses 112*a* arranged in the first direction B. Each recess 112*a* has a groove shape extending in the axial direction A. Then, in a state where the holder 104 is assembled to the unit 110, the housing portions 12 of the energy storage apparatus 1 facing the side plate 112 are fitted into the respective recesses 112*a*. Consequently, the side plate 112 extends along the curved surface of the housing portions 12. Accordingly, the energy storage apparatus 1 can be more stably held. Particularly, displacement of the energy storage apparatuses 1 in the first direction B can be restricted.

In addition, the side plate 112 of the present embodiment has a corrugated plate shape in which recesses and projections are repeated in the first direction B. That is, as viewed from one main front surface side, the plurality of recesses 112*a* and the plurality of projections 112*b* are alternately arranged in the first direction B. Accordingly, the housing portions 12 of the energy storage apparatuses 1 arranged on both sides of the side plate 112 interposed therebetween can be fitted into the side plate 112. Specifically, with respect to the recesses 112*a* and projections 112*b* when the side plate 112 is viewed from one main front surface side, the housing portions 12 of one of the energy storage apparatuses 1 are fitted into the respective recesses 112*a*. The housing portions 12 of the other energy storage apparatus 1 are fitted into the respective projections 112*b* (which are recesses as viewed from the opposite side) from the back surface. Accordingly, the stability of each energy storage apparatus 1 in the energy storage module 100 can be further enhanced.

Note that there is no other unit 110 on the exposed surface side of the unit 110 located at one end in the second direction C. Thus, an end holder 105 is assembled to the exposed surface of the unit 110. The end holder 105 has a similar shape to the holder 104 except that the protruding direction of the protrusions 114 is opposite to that of the holder 104 and the protrusions 114 do not include the distal ends 114*a*.

In a state where the plurality of units 110 is connected, the bus bar 108 is set on both sides of the plurality of units 110 in the axial direction A via the insulating plates 106. The first electrode leads 8 and the second electrode leads 10 of each energy storage apparatus 1 are electrically connected to the bus bars 108. For example, each electrode lead is joined to the bus bar 108 by known joining treatment such as laser welding. By interposing the insulating plate 106 between the unit 110 and the bus bar 108, it is possible to suppress electrical connection between each energy storage apparatus 1 and the bus bar 108 at portions other than the electrode leads. The insulating plate 106 may be any insulator having a predetermined hardness, and may be made of a material similar to the separator 102 or may be made of another material.

In the present embodiment, the two energy storage apparatuses 1 of each unit 110 are set in posture such that the individual first electrode leads 8 protrude in the same orientation. In addition, the units 110 are set in posture such that the first electrode leads 8 protrude in opposite directions alternately. Accordingly, when the electrode leads are joined to the bus bar 108, the electrode assemblies 2 in each unit 110 are connected in parallel to each other, and the units 110 are connected in series to each other.

Note that an aspect of electrical connection of the electrode assemblies 2 is not particularly limited. For example, in each energy storage apparatus 1, the first electrode leads 8 and the second electrode leads 10 may be alternately arranged, and the first electrode lead 8 and second electrode lead 10 that are adjacent each other may be electrically connected. That is, in each energy storage apparatus 1, the plurality of electrode assemblies 2 may be connected in series. In each unit 110, two of the energy storage apparatuses 1 may be connected in series. Further, all the electrode assemblies 2 mounted in the energy storage module 100 may be connected in series or in parallel.

The first electrode leads 8 and the second electrode leads 10 may protrude in the same orientation of the axial direction A. Accordingly, the electrode assemblies 2 can be electrically connected by arranging the insulating plates 106 and the bus bars 108 on only one side of the energy storage module 100. Thus, the number of parts and man-hours for assembling the energy storage module 100 can be reduced.

As described above, the energy storage apparatus 1 according to the present embodiment includes the plurality of electrode assemblies 2 that are cylindrical, and the film outer body 4 including the plurality of housing portions 12 that individually wrap the plurality of electrode assemblies 2, and the sealing portion 14 that seals each housing portion 12 and connects the plurality of housing portions 12 to each other. Then, the film outer body 4 is bent or curved between the housing portions 12 that are adjacent each other to extend in a zigzag manner. The energy storage module 100 according to the present embodiment includes the plurality of energy storage apparatuses 1 and the holders 104 that hold the plurality of energy storage apparatuses 1.

In a case where the electrode assemblies 2 are individually housed in the plurality of housing portions 12, a large load may be applied to the sealing portion 14 due to generation of gas in the housing portion 12 or swelling of some of the electrode assemblies 2 caused by charging and discharging of the energy storage apparatus 1. When the sealing portion 14 is damaged and the inside of the housing portion 12 and the outside of the film outer body 4 are connected, the electrolytic solution 16 may leak to the outside of the film outer body 4. When the sealing portion 14 is damaged and the housing portions 12 adjacent each other are connected, the power generation performance of the energy storage apparatus 1 may be deteriorated due to, for examples, short-circuiting of the electrode assemblies 2 adjacent each other or deviation in the amount of the electrolytic solution 16 between the two housing portions 12.

Thus, in order to ensure the sealing property of the electrode assemblies 2, it is desired to increase the area of the sealing portion 14 to increase the strength of the sealing portion 14. Particularly in recent years, higher capacity of the energy storage apparatus 1 tends to be required, and with the higher capacity, the more swelling amount of the electrode assembly 2 tends to be as well. Thus, the need to enhance the strength of the sealing portion 14 has increased. However, enlarging the sealing portion 14 leads to upsizing of the energy storage apparatus 1. Upsizing the energy storage apparatus 1 leads to decrease in filling rate of the electrode assembly 2 in the energy storage module 100, that is, decrease in energy density of the energy storage module 100. On the other hand, if the size of the sealing portion 14 is reduced to increase energy density of the energy storage module 100, the sealing property of the electrode assembly 2 is sacrificed.

In contrast, in the energy storage apparatus 1 according to the present embodiment, the film outer body 4 is folded in a zigzag manner. Accordingly, it is possible to shorten an interval between the housing portions 12 adjacent each other and hence a length of the energy storage apparatus 1 as compared with a case where the film outer body 4 is not folded, without reducing the size of the sealing portion 14. Consequently, the number of electrode assemblies 2 mounted in the energy storage module 100 can be increased, or the energy storage module 100 can be downsized without reducing the number of electrode assemblies 2. That is, according to the present embodiment, it is possible to improve the energy density of the energy storage module 100 while suppressing the decrease in the sealing property of the electrode assemblies 2.

Since a pouch structure in which the plurality of electrode assemblies 2 is sealed with the film outer body 4 is adopted, the weight of the energy storage module 100 can be reduced as compared with the case where the electrode assemblies 2 are individually sealed with the outer cans. Particularly in a case where the number of electrode assemblies 2 mounted in the energy storage module 100 increases with an increase in capacity of the energy storage module 100, a remarkable weight reduction effect can be obtained.

The sealing portion 14 of the present embodiment includes a first side **14*a* that seals the ends of the housing portions 12 in the axial direction A of the electrode assemblies 2. Further, the film outer body 4 is bent or curved such that two of the first sides 14*a* corresponding to adjacent two of the housing portions 12 extend in a direction intersecting each other. Accordingly, it is possible to easily prevent the sealing portion 14 from protruding outward from the housing portions 12 in the second direction C. Alternatively, the protruding amount of the sealing portion 14 can be reduced. Consequently, upsizing the energy storage apparatus 1 in the second direction C can be suppressed, so that the energy density of the energy storage module 100** can be further increased.

In addition, the holder 104 of the present embodiment includes the side plate 112 extending in the arrangement direction (first direction B) of the plurality of housing portions 12. The side plate 112 includes the plurality of recesses **112*a* arranged in the first direction B, and the housing portions 12 are fitted into the respective recesses 112*a*. Accordingly, the energy storage apparatus 1 can be more stably held. Thus, the electrical connection state between each energy storage apparatus 1 and the bus bar 108 can be more stably maintained, and the breakage or the like of each energy storage apparatus 1 can be further suppressed. Accordingly, the power generation performance and the safety performance of the energy storage module 100** can be enhanced.

In addition, the side plate 112 of the present embodiment has a corrugated plate shape in which recesses and projections are repeated in the first direction B, and is arranged between two of the energy storage apparatuses 1. Further, the housing portions 12 of one energy storage apparatus 1 are fitted into the respective recesses **112*a* as viewed from one main front surface side, and the housing portions 12 of the other energy storage apparatus 1 are fitted into the respective projections 112*b* from the back surface side as viewed from the main front surface side. Accordingly, the stability of each energy storage apparatus 1 in the energy storage module 100** can be further enhanced.

Second Embodiment

Figure 8:
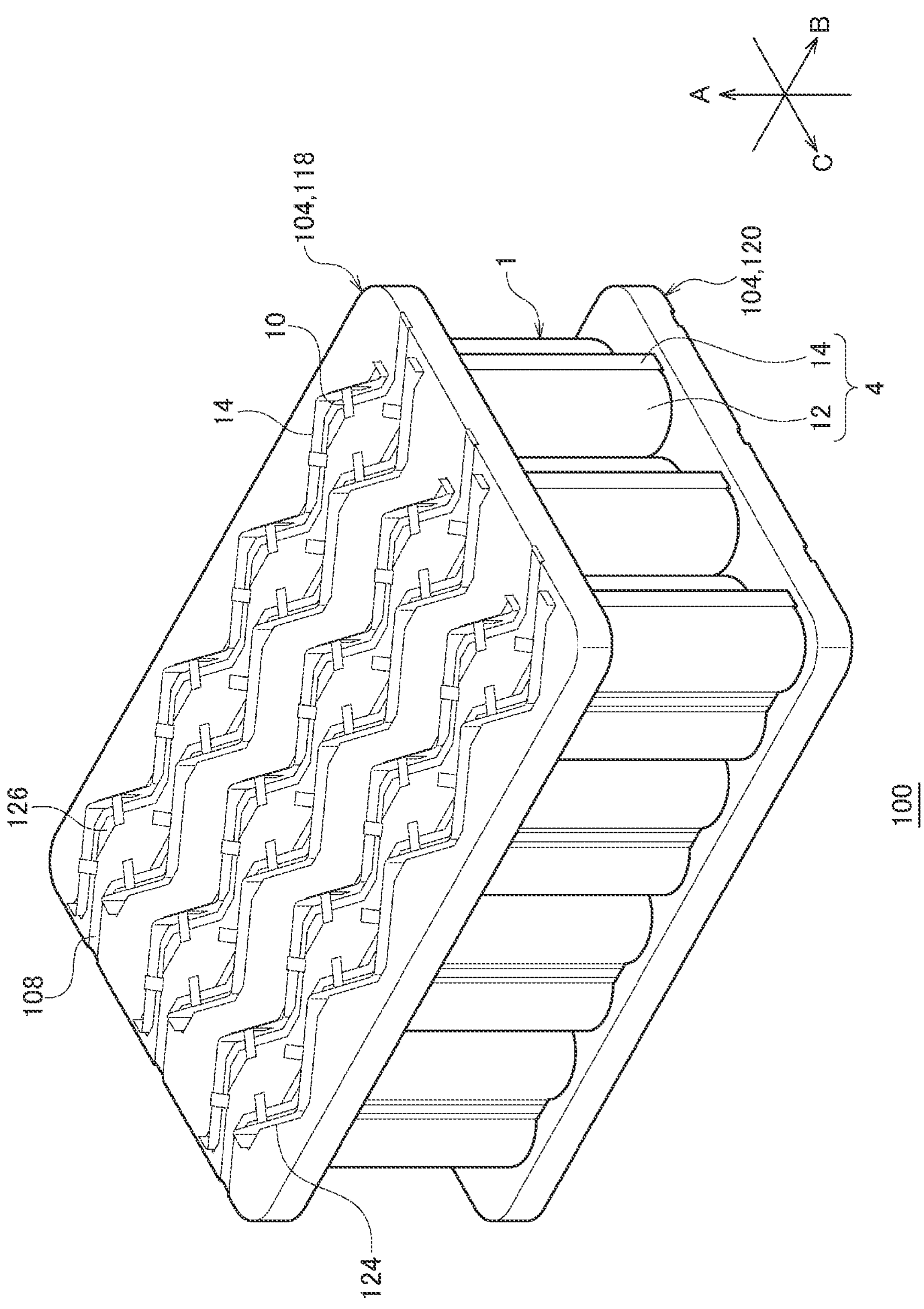
FIG. 8 is a perspective view of an energy storage module according to a second embodiment.
Figure 9:
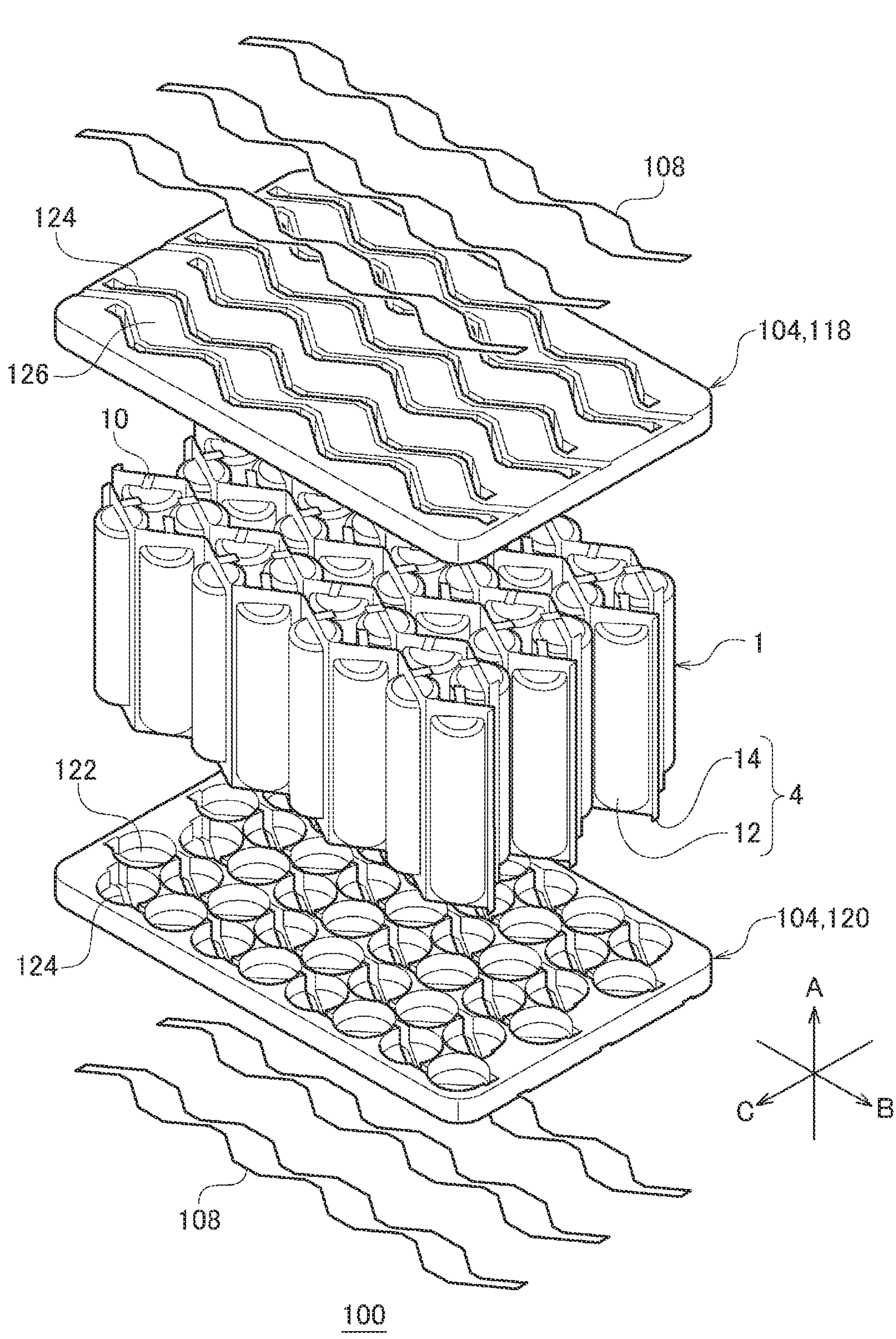
FIG. 9 is an exploded perspective view of the energy storage module.
Figure 10:
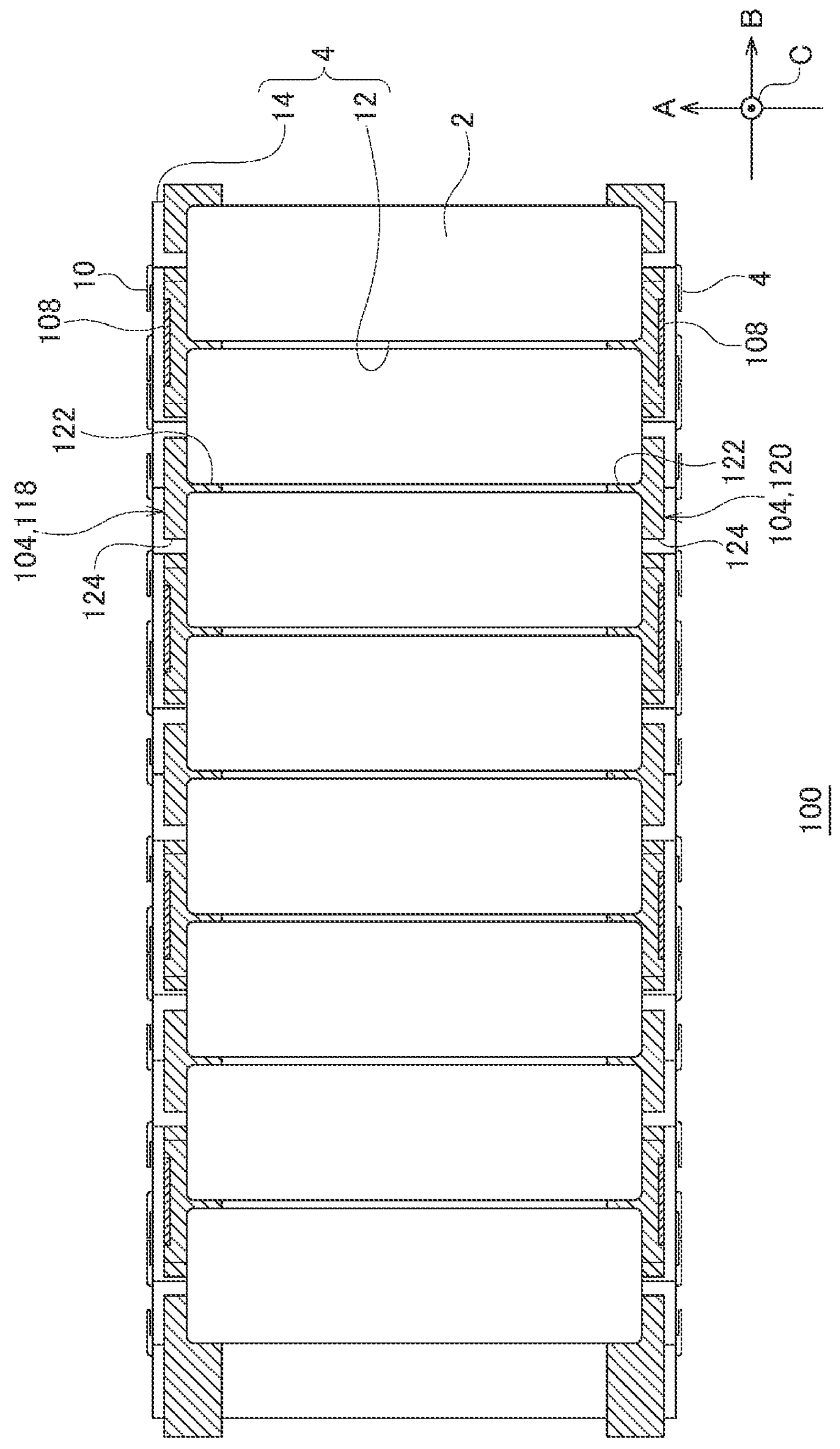
FIG. 10 is a cross-sectional view of the energy storage module.

The second embodiment has common configurations with the first embodiment except for a holding structure of the energy storage apparatus 1. Hereinafter, the present embodiment will be described focusing on components different from those of the first embodiment, and the common components will be briefly described or description thereof will be omitted. FIG. 8 is a perspective view of an energy storage module 100 according to the second embodiment. FIG. 9 is an exploded perspective view of the energy storage module 100. FIG. 10 is a cross-sectional view of the energy storage module 100.

The energy storage module 100 of the present embodiment includes a plurality of energy storage apparatuses 1, holders 104, and bus bars 108. The number of the energy storage apparatuses 1 mounted in the energy storage module 100 and the number of electrode assemblies 2 mounted in the energy storage apparatus 1 are not limited to those illustrated in the drawings. Each energy storage apparatus 1 includes the plurality of electrode assemblies 2 and a film outer body 4. A first electrode lead 8 and a second electrode lead 10 protrude from each electrode assembly 2. The film outer body 4 includes a plurality of housing portions 12 and a sealing portion 14. The film outer body 4 is bent or curved between the housing portions 12 that are adjacent each other to extend in a zigzag manner.

The plurality of energy storage apparatuses 1 is set in posture such that the individual housing portions 12 are arranged in the same direction, and the energy storage apparatuses 1 are arranged in a second direction C. Adjacent two of the energy storage apparatuses 1 are arranged to be shifted from each other in a first direction B such that, between the valley of two of the housing portions 12 of one energy storage apparatus 1, the housing portion 12 of the other energy storage apparatus 1 is fitted.

The plurality of energy storage apparatuses 1 is held by a holder 104. The holder 104 of the present embodiment includes a first plate 118 and a second plate 120. The first plate 118 and the second plate 120 are plate-shaped bodies extending in the first direction B and the second direction C, and are arranged with the plurality of energy storage apparatuses 1 interposed therebetween in the axial direction A. A material forming the first plate 118 and the second plate 120 is similar to that of the holder 104 of the first embodiment.

On the surfaces of the first plate 118 and the second plate 120 facing the energy storage apparatus 1, a plurality of supporting portions 122 that are bottomed cylindrical recesses are formed. The plurality of supporting portions 122 is arranged so as to overlap the housing portions 12 of each energy storage apparatus 1 in the axial direction A, and the ends of the housing portions 12 in the axial direction A are fitted into the respective supporting portions 122. As an example, each of the plates and the plurality of energy storage apparatuses 1 are fixed to each other by adhesive. By interposing a plurality of columns (not illustrated) between the first plate 118 and the second plate 120, the plurality of columns and the plates may be connected.

The first plate 118 and the second plate 120 are formed with a plurality of slits 124 that penetrate the plates in the axial direction A and extend in a zigzag manner in the first direction B. Each slit 124 extends so as to connect the supporting portions 122 adjacent each other while dividing the bottom of the supporting portions 122, that is, over the plurality of supporting portions 122. The plurality of slits 124 is arranged so as to overlap the sealing portion 14 of the energy storage apparatuses 1 in the axial direction A, and each end (including a first side 14*a*) of the sealing portion 14 in the axial direction A is inserted into the slits 124. Accordingly, the first electrode lead 8 and the second electrode lead 10 of each energy storage apparatus 1 protrude to the outside of the holder 104. Only the first electrode lead 8 and the second electrode lead 10 may be inserted into the slit 124.

On the surfaces of the first plate 118 and the second plate 120 facing the sides opposite to the energy storage apparatuses 1, a plurality of bus bar setting surfaces 126 is provided. Accordingly, the holder 104 of the present embodiment also functions as the insulating plates 106 of the first embodiment. Each bus bar setting surface 126 is arranged between two of the slits 124 arranged in the second direction C.

In a state where the first plate 118 and the second plate 120 are assembled to the plurality of energy storage apparatuses 1 and the bus bars 108 are mounted on the bus bar setting surfaces 126, the first electrode leads 8 and the second electrode leads 10 protruding from the slits 124 are electrically connected to the bus bars 108 extending in the first direction B. In the present embodiment, all the first electrode leads 8 protrude in the same orientation. Accordingly, when each electrode lead is joined to the bus bar 108, all the electrode assemblies 2 are connected in parallel. Similar to the first embodiment, an aspect of electrical connection of the electrode assemblies 2 is not particularly limited. In addition, the shape of the bus bar 108 is also not limited. For example, a plurality of the bus bars connecting the electrode assemblies 2 adjacent each other in series may be arranged in the first direction B.

The holder 104 of the present embodiment includes the first plate 118 and the second plate 120, but may include only one of the plates. For example, by increasing the size of one of the plates in the axial direction A and providing supporting portions 122 that are deeper, only the plate can hold the plurality of energy storage apparatuses 1.

According to the present embodiment, it is also possible to improve the energy density of the energy storage module 100 while suppressing decrease in the sealing property of the electrode assemblies 2. In addition, the number of parts and man-hours for assembling the energy storage module 100 can be reduced as compared with the first embodiment. Note that, in the first embodiment, the number of the energy storage apparatuses 1 mounted in the energy storage module 100 can be changed more easily than in the present embodiment.

Third Embodiment

Figure 11:
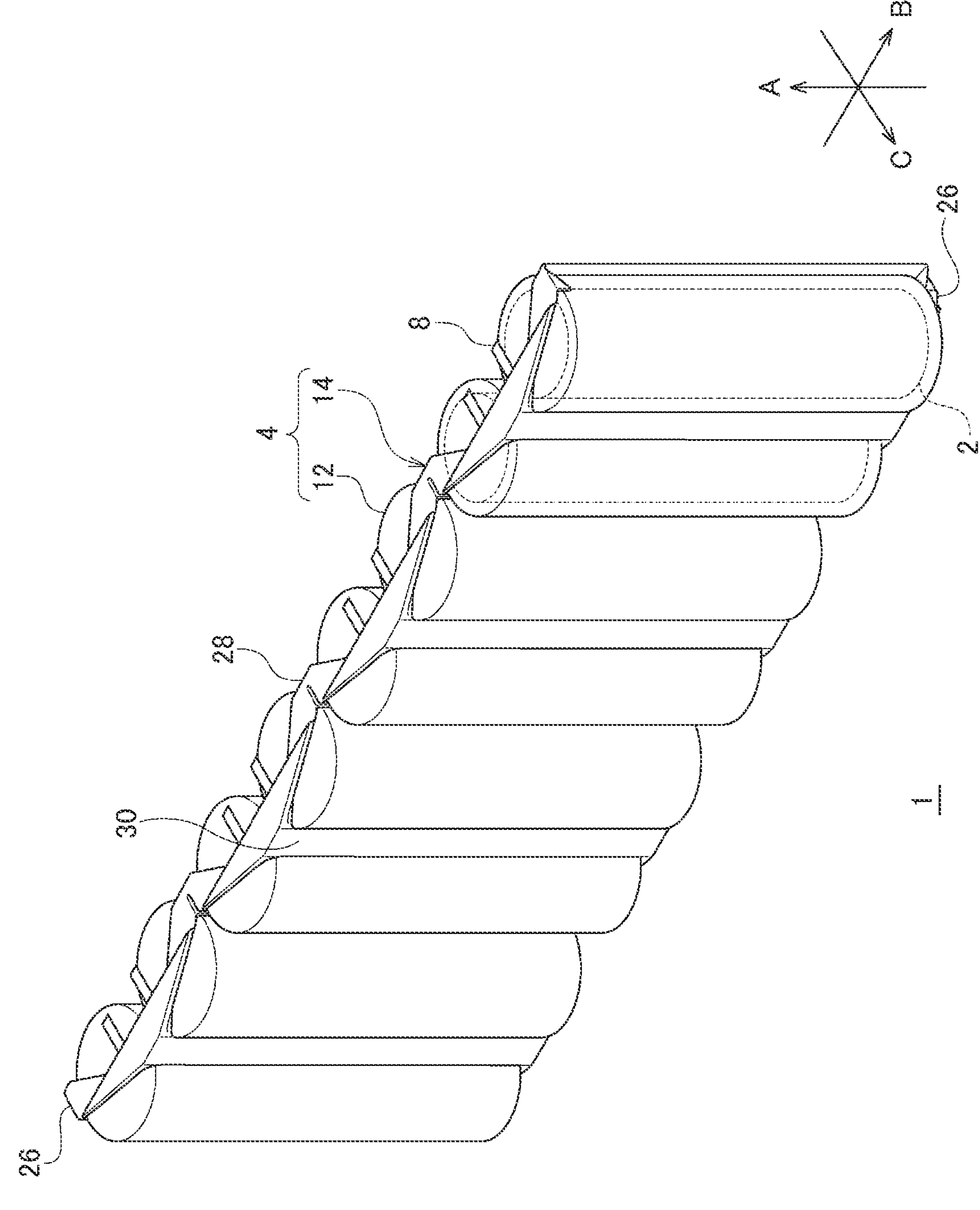
FIG. 11 is a perspective view of an energy storage apparatus according to a third embodiment.
Figure 12:
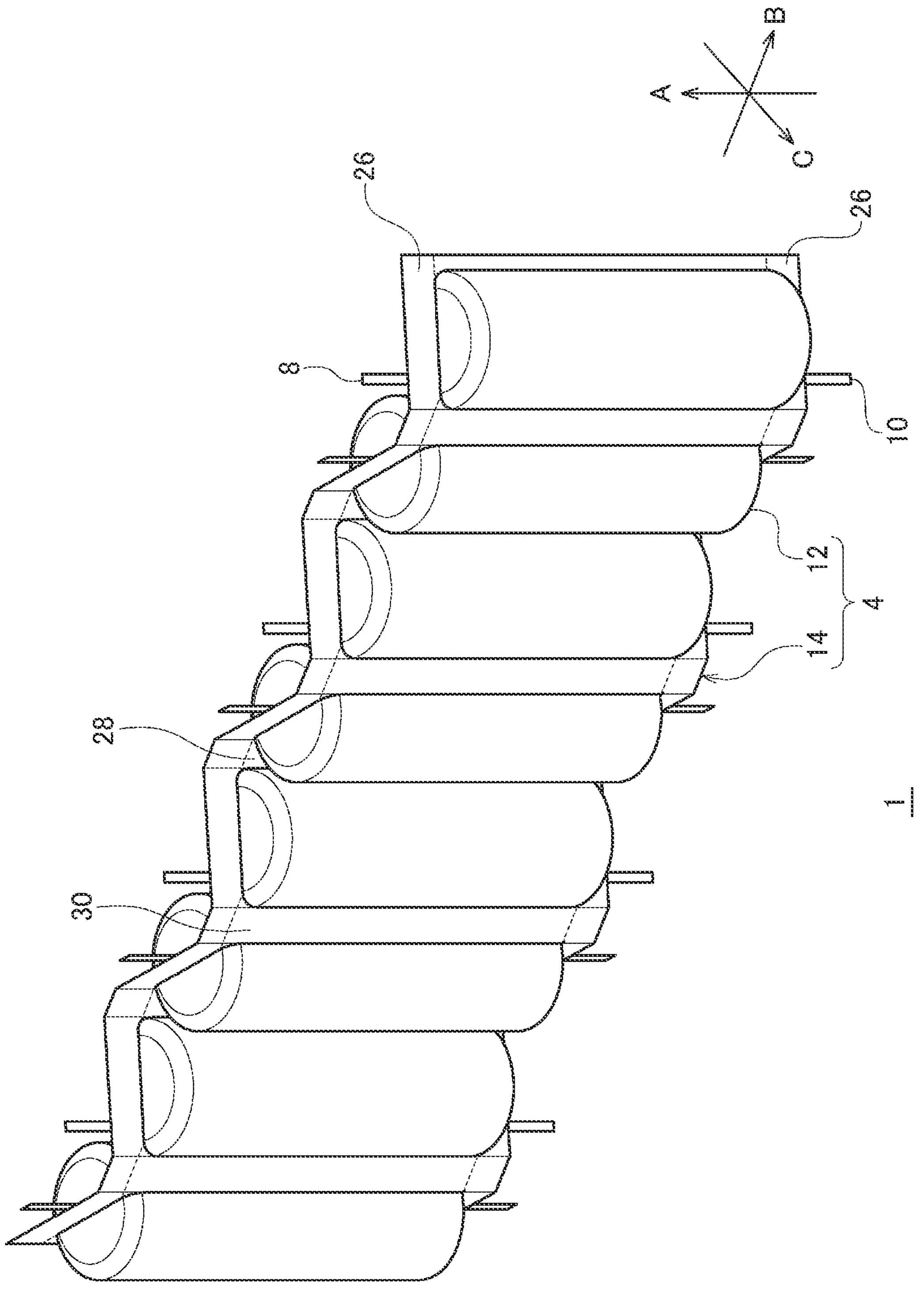
FIG. 12 is a perspective view of the energy storage apparatus before outer edges thereof are folded.

FIG. 11 is a perspective view of an energy storage apparatus 1 according to a third embodiment. FIG. 12 is a perspective view of the energy storage apparatus 1 before outer edges 26 thereof are folded. In FIG. 11, a part of electrode assemblies 2 is indicated by a broken line. In the present embodiment, a direction in which an axis of the spiral of the electrode assembly 2 extends is defined as an axial direction A, a direction in which the plurality of electrode assemblies 2 is arranged is defined as an arrangement direction B, and a direction orthogonal to the axial direction A and the arrangement direction B is defined as an orthogonal direction C.

The energy storage apparatus 1 of the present embodiment is, for example, a chargeable secondary battery such as a lithium-ion battery, a nickel-hydrogen battery, or a nickel-cadmium battery, or a capacitor such as an electric double layer capacitor. The energy storage apparatus 1 includes the plurality of electrode assemblies 2 and a film outer body 4. Although the energy storage apparatus 1 of the present embodiment includes the eight electrode assemblies 2, the number of the electrode assemblies 2 is not particularly limited, and it is only required to be two or more.

Each electrode assembly 2 is cylindrical, and has a wound-type structure in which a first electrode plate having a strip shape and a second electrode plate having a strip shape are laminated with an interelectrode separator interposed therebetween and are spirally wound. As an example, the first electrode plate is a negative electrode plate, and the second electrode plate is a positive electrode plate. A first electrode lead 8 is electrically connected to the first electrode plate. A second electrode lead 10 is electrically connected to the second electrode plate. For example, the first electrode lead 8 and the second electrode lead 10 have a strip shape (a rectangular shape elongated in one direction), and one end of each of the leads is welded to the corresponding electrode plate. The plurality of electrode assemblies 2 is set in posture such that the axial directions A of the electrode assemblies 2 are parallel to each other, and is arranged in an arrangement direction B at predetermined intervals. The plurality of electrode assemblies 2 is wrapped in the film outer body 4 that is common.

The film outer body 4 has, for example, a structure in which two laminating films are laminated. Each laminating film has, for example, a structure in which thermoplastic resin sheets are laminated on both surfaces of a metal sheet such as aluminum. The film outer body 4 includes a plurality of housing portions 12 and a sealing portion 14. The plurality of housing portions 12 is arranged in the arrangement direction B at predetermined intervals. Each housing portion 12 is cylindrical, and wraps and houses each electrode assembly 2 therein. Each housing portion 12 is formed from a bag portion provided in the film outer body 4. The bag portion is a portion where the two laminating films are separated from each other. Accordingly, each housing portion 12 protrudes from the sealing portion 14 along the shape of the side surface of the electrode assembly 2. Electrolytic solution is housed in each housing portion 12 together with the electrode assembly 2.

The sealing portion 14 surrounds the outer periphery of each housing portion 12 to seal the housing portion 12. The sealing portion 14 is formed from, for example, a welded portion of thermoplastic resin sheets. The welded portion is obtained by subjecting the outer periphery of the bag portions of the film outer body 4 to a thermocompression bonding treatment, and welding each thermoplastic resin sheet of the two laminating films to each other. The sealing portion 14 seals each housing portion 12 and connects the plurality of housing portions 12 to each other.

Each end of the first electrode lead 8 and the second electrode lead 10 on the opposite side to the side connected to the electrode assembly 2 protrudes to the outside of the film outer body 4. In addition, the first electrode lead 8 and the second electrode lead 10 connected to each electrode assembly 2 protrude in the opposite orientations of the axial direction A. Each of the first electrode leads 8 protrudes in the same orientation. The sealing portion 14 of the present embodiment includes a pair of the outer edges 26 extending over the plurality of housing portions 12 on the outer side with respect to the housing portions 12 in the axial direction A. Each first electrode lead 8 protrudes from one outer edge 26 to the outside of the film outer body 4. Each second electrode lead 10 protrudes from the other outer edge 26 to the outside of the film outer body 4. Boundary faces between each electrode lead and the outer edges 26 are sealed with known sealant.

The film outer body 4 is bent between the housing portions 12 adjacent each other to meander in the arrangement direction B. That is, the film outer body 4 extends in a substantially zigzag manner as viewed in the axial direction A. By folding the film outer body 4 in a zigzag manner, intervals between individual housing portions 12 in the arrangement direction B can be narrowed as compared with a state before the film outer body 4 is folded, and hence a length of the energy storage apparatus 1 in the arrangement direction B can be shorter.

In addition, the plurality of housing portions 12 of the present embodiment is, in a state where the film outer body 4 meanders, arranged such that individual centers thereof are arranged on the same straight line as viewed from the axial direction A. Accordingly, it is possible to suppress increase in size of the energy storage apparatus 1 in the orthogonal direction C as compared with a case where the plurality of housing portions 12 is arranged such that individual centers thereof are shifted in the orthogonal direction C. In addition, the sealing portion 14 that is bent in a zigzag shape is arranged on the inner side with respect to the housing portions 12 in the orthogonal direction C. Accordingly, it is possible to suppress increase in size of the energy storage apparatus 1 in the orthogonal direction C by folding the film outer body 4. Note that the centers of the plurality of housing portions 12 are not necessarily arranged on the same straight line in the present disclosure.

The sealing portion 14 includes first connectors 28 and second connectors 30 that are arranged between adjacent two of the housing portions 12 and connect the two housing portions 12. The first connectors 28 and the second connectors 30 are alternately arranged in the arrangement direction B and are shifted from each other in the orthogonal direction C. In addition, each of the connectors is long in the axial direction A and extends parallel to the arrangement direction B. Each of the connectors is arranged between the two housing portions 12 in the arrangement direction B, and between two of the outer edges 26 in the axial direction A. In each housing portion 12, both ends in the axial direction A are sealed by the outer edges 26. One end in the arrangement direction B is sealed by the first connector 28, and the other end in the arrangement direction B is sealed by the second connector 30.

As illustrated in FIG. 12, in a state before the outer edges 26 are folded, regions of the outer edges 26 continuous from the housing portions 12, that is, regions overlapping the housing portions 12 as viewed in the axial direction A extend linearly through the centers of the housing portions 12 as viewed in the axial direction A and obliquely with respect to the arrangement direction B. In adjacent two of the housing portions 12, the outer edge 26 located on one housing portion 12 and the outer edge 26 located on the other housing portion 12 extend in different directions. The outer edge 26 located on the housing portions 12 and the outer edge 26 located on the first connectors 28 are connected to each other at a predetermined angle, that is, non-linearly. The outer edge 26 located on the housing portions 12 and the outer edge 26 located on the second connectors 30 are also connected non-linearly, as well. Consequently, the outer edges 26 meander in the arrangement direction B, and then the film outer body 4 meanders in the arrangement direction B.

The outer edges 26 are inclined from a standing state as illustrated in FIG. 12 to the orthogonal direction C to be laid down as illustrated in FIG. 11. Accordingly, the size of the energy storage apparatus 1 in the axial direction A can be reduced. However, since the outer edges 26 meanders, by simple inclination to the orthogonal direction C, the outer edges 26 are disorderly bent. When the outer edges 26 are disorderly bent, the number and the total length of the formed fold lines increase. Since the film outer body 4 is formed by welding two laminating films, the films are easily peeled off at the fold line portions. Thus, it is preferable to reduce the fold lines formed when the outer edges 26 are inclined to the orthogonal direction C as much as possible.

Figure 13:
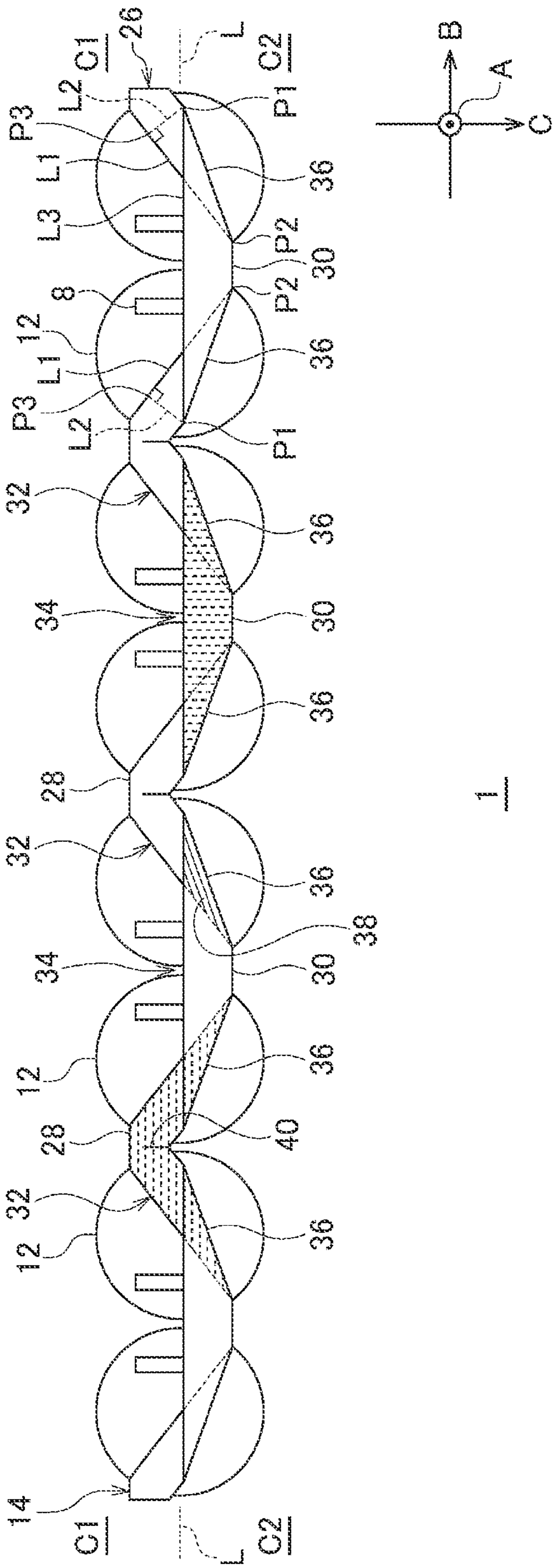
FIG. 13 is a view of the energy storage apparatus as viewed from the axial direction.
Figure 14A:
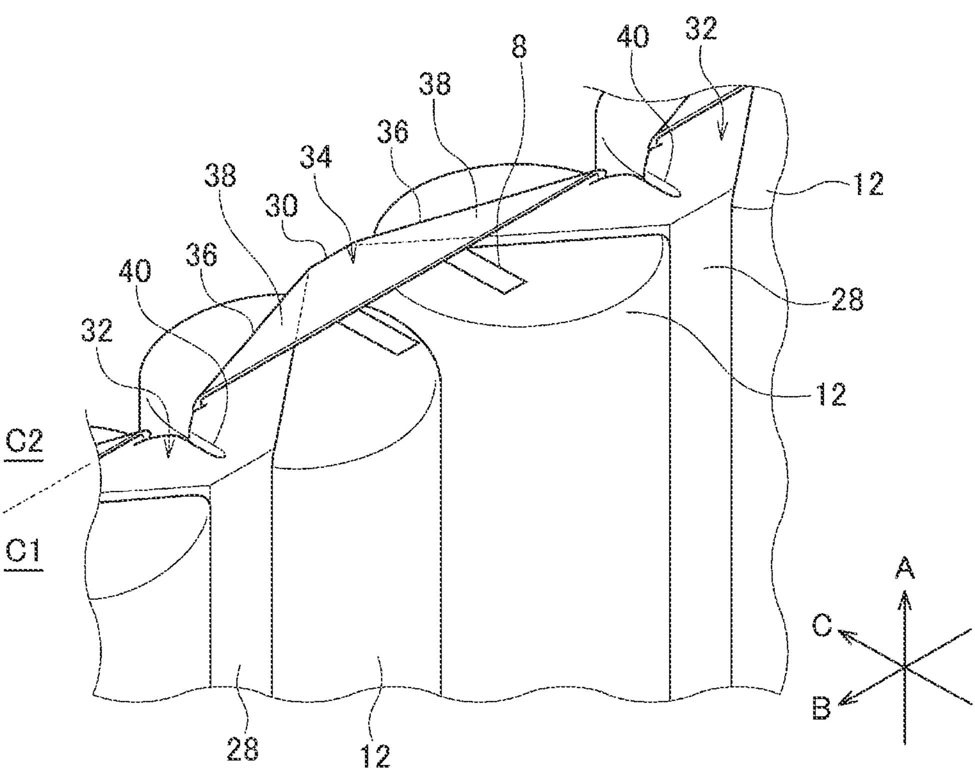
FIGS. 14A and 14B are perspective views of a part of the energy storage apparatus as viewed from a first orientation of the orthogonal direction.
Figure 14B:
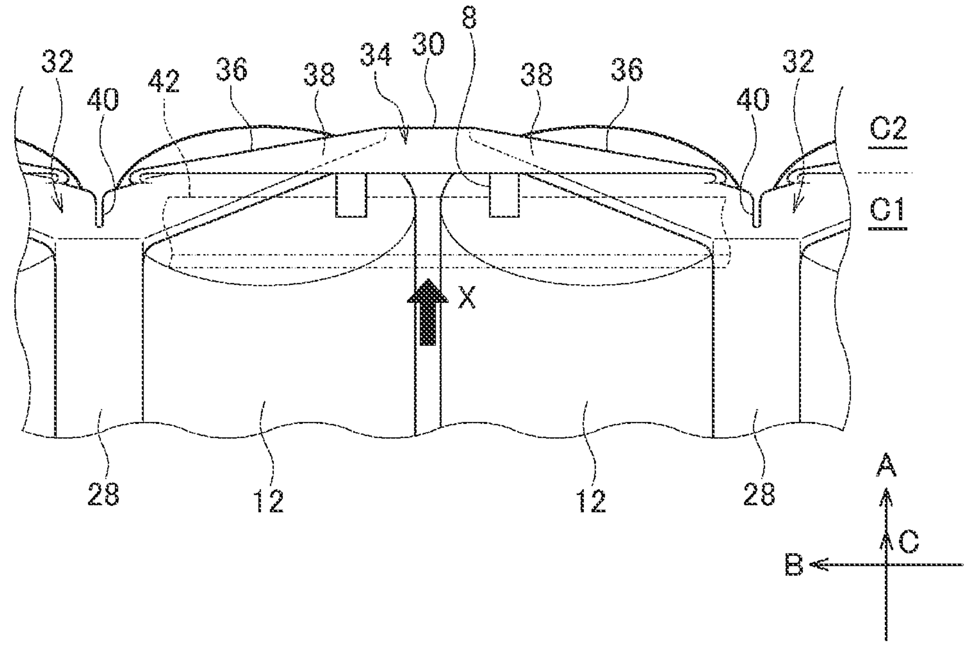
Figure 15A:
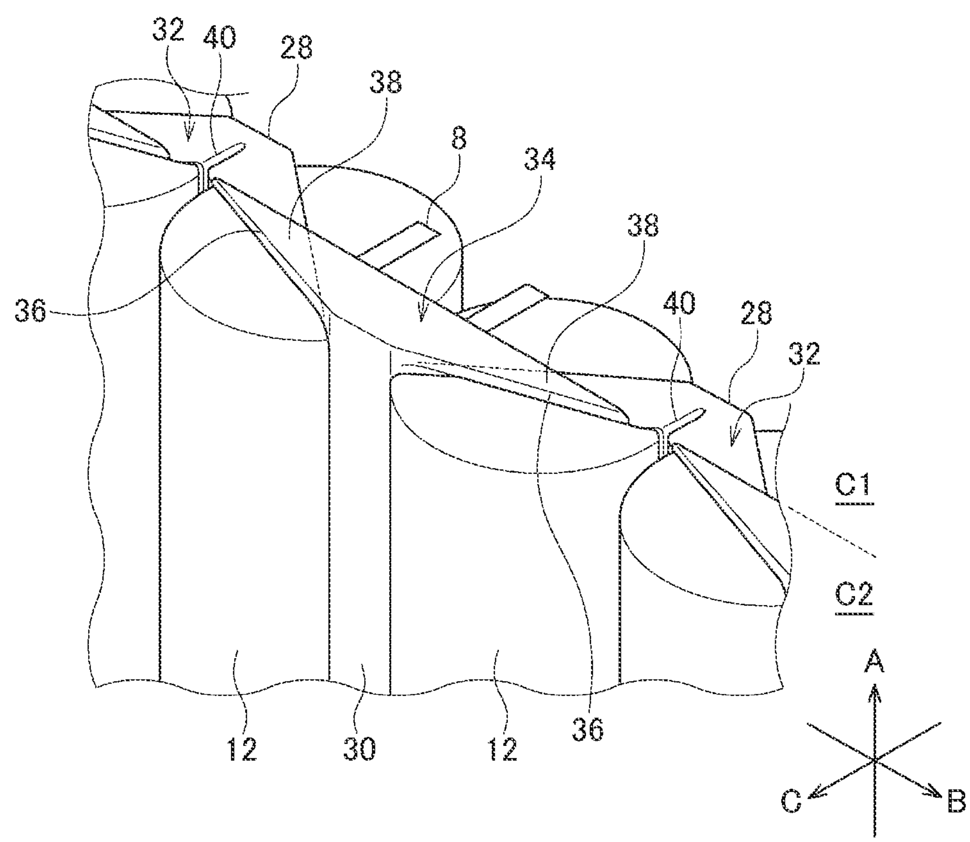
FIGS. 15A and 15B are perspective views of a part of the energy storage apparatus as viewed from a second orientation of the orthogonal direction.
Figure 15B:
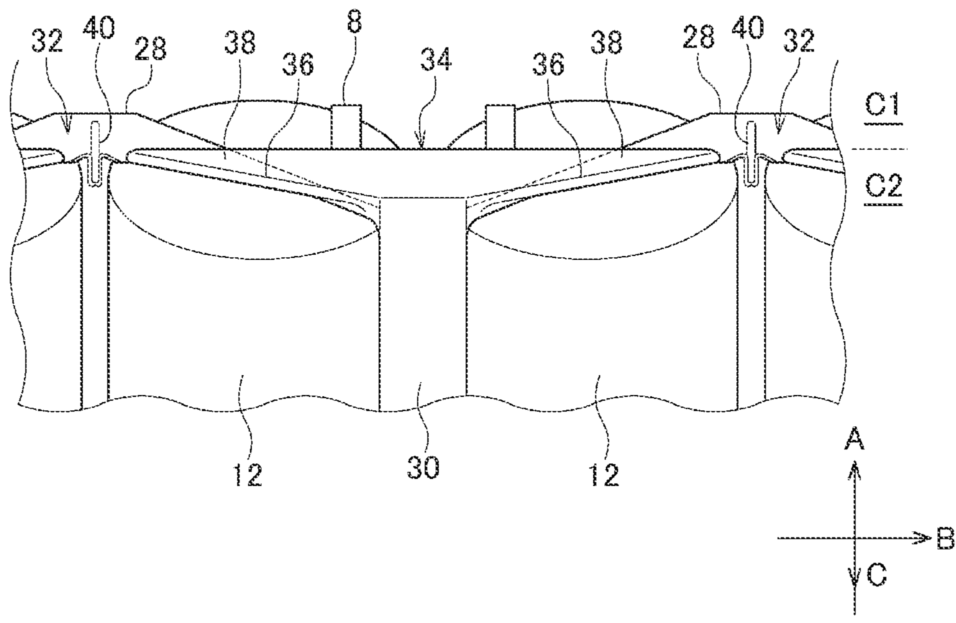

In contrast, in the energy storage apparatus 1 of the present embodiment, the outer edges 26 are folded in a manner described below. FIG. 13 is a view of the energy storage apparatus 1 as viewed from the axial direction A. FIGS. 14A and 14B are perspective views of a part of the energy storage apparatus 1 as viewed in a first orientation C1 of the orthogonal direction C. FIGS. 15A and 15B are perspective views of a part of the energy storage apparatus 1 as viewed in a second orientation C2 of the orthogonal direction C.

As described above, the sealing portion 14 includes the first connectors 28 and the second connectors 30. As viewed from the axial direction A, the first connectors 28 are shifted in the first orientation C1 of the orthogonal direction C with respect to a center line L passing through the centers of the plurality of housing portions 12, and extends parallel to the center line L. On the other hand, the second connectors 30 are shifted in the second orientation C2 in the orthogonal direction C with respect to the center line L, and extends parallel to the center line L.

The outer edges 26 each include first inclined portions 32 and second inclined portions 34. In FIG. 13, regions indicated by horizontal broken lines are the first inclined portions 32, and regions indicated by vertical broken lines are the second inclined portions 34. The first inclined portions 32 each are a region continuous from the first connector 28 and the housing portions 12. At a connection portion between the first connector 28 and the housing portions 12, the first inclined portion 32 is bent to the side of the second connectors 30 in the orthogonal direction C, that is, in the second orientation C2 with respect to the connection portion. On the other hand, the second inclined portions 34 each are a region continuous from the second connector 30 and adjacent two of the first inclined portions 32 arranged with the second connector 30 interposed therebetween. At a connection portion between the second connector 30 and the two first inclined portions 32, the second inclined portion 34 is bent to the side of the first connectors 28 in the orthogonal direction C, that is, in the first orientation C1 with respect to the connection portion. The connection portion between the first inclined portion 32 and the second inclined portion 34 corresponds to a folded-back line 36 in which the outer edge 26 that has been inclined in the second orientation C2 is folded back in the first orientation C1. One end point of the folded-back line 36 is in contact with the second connector 30.

That is, portions of the outer edge 26 located on the first connectors 28 as viewed in the axial direction A are inclined in the second orientation C2 to form parts of the first inclined portions 32. Portions located on the second connectors 30 are inclined in the first orientation C1 to form parts of the second inclined portions 34. Portions located on the housing portions 12 are inclined in the second orientation C2, then folded back obliquely, and then to be inclined in the first orientation C1. The portions inclined in the second orientation C2 form parts of the first inclined portions 32, and the portions inclined in the first orientation C1 form parts of the second inclined portions 34.

Accordingly, the first inclined portions 32 and the second inclined portions 34 overlap each other on the housing portions 12 as viewed from the axial direction A to form overlapping portions 38. In FIG. 13, regions indicated by solid oblique lines are the overlapping portions 38. In the overlapping portions 38, the first inclined portions 32 are located on the housing portion 12 side with respect to the second inclined portions 34. That is, the second inclined portions 34 are superimposed on the first inclined portions 32. The first inclined portions 32 each include a valley fold 40 fitted between the housing portions 12 adjacent each other. In each of the first connectors 28, a portion loosened in the arrangement direction B by the inclination in the second orientation C2, that is, an extra portion due to the circumferential length difference between the inner periphery and the outer periphery in the first inclined portion 32 is fitted between the two housing portions 12 to form the valley fold 40.

By folding the outer edges 26 in the above-described manner, the number and the total length of the fold lines formed when the outer edges 26 are folded can be reduced. In addition, the second inclined portions 34 of the present embodiment each have an isosceles trapezoidal shape including the connection portion with the second connector 30 (a boundary line between the second inclined portion 34 and the second connector 30) as a base and the two folded-back lines 36 connecting the first inclined portion 32 and the second inclined portion 34 (connection portions between the first inclined portion 32 and the second inclined portion 34) as legs as viewed from the axial direction A. Accordingly, the total length of the fold lines formed in the outer edges 26 can be further shortened.

In a case where the outer edges 26 are folded as described above, the following conditions are satisfied. That is, as illustrated in FIG. 13, end points of the folded-back lines 36 opposite to the second connectors 30 are defined as end points P1, and end points in contact with the second connectors 30 are defined as end points P2. The connection portions between the first inclined portions 32 and the housing portions 12 are defined as boundary lines L1, and perpendicular lines drawn from the end points P1 to the boundary lines L1 are defined as perpendicular lines L2. Intersection points of the boundary lines L1 and the perpendicular lines L2 are defined as intersection points P3. An outermost side of the film outer body 4 is defined as an outermost side L3. The folded-back lines 36 and the outermost side L3 join at the end points P1. Triangles having apexes at the end points P1, the end points P2, and the intersection points P3 are formed on both sides of each second connector 30 in the arrangement direction B. At this time, the sum of the distance from the intersection point P3 to the end point P2 in one of the triangles, the length of the second connector 30 (the distance between the two end points P2), and the distance from the end point P2 to the intersection point P3 in the other triangle is substantially equal to the length of the outermost side L3 between the two end points P1.

The first electrode leads 8 of the electrode assemblies 2 are electrically connected by bus bars 42. The bus bars 42 each are a strip shaped conductive member extending in the arrangement direction B. Specifically, as illustrated in FIG. 14B, the bus bars 42 are inserted between the housing portions 12 and the first electrode leads 8 from the side in the first orientation C1. For example, the first electrode leads 8 that are set on the bus bars 42 are joined to the bus bars 42 by, for example, known joining treatment such as laser welding. Accordingly, the plurality of electrode assemblies 2 is electrically connected to each other. An insulating sheet may be interposed between the bus bars 42 and the housing portions 12. In a similar manner, the second electrode leads 10 of the electrode assemblies 2 are electrically connected.

In the present embodiment, the plurality of first electrode leads 8 protrudes in the same orientation. Thus, when the individual electrode leads are joined to the bus bars 42, all of the electrode assemblies 2 are connected in parallel. However, an aspect of electrical connection of the electrode assemblies 2 is not particularly limited, and for example, the first electrode leads 8 and the second electrode leads 10 may be alternately arranged, and the first electrode lead 8 and second electrode lead 10 that are adjacent each other may be electrically connected. That is, the plurality of electrode assemblies 2 may be connected in series. The first electrode lead 8 and the second electrode lead 10 in each electrode assembly 2 may protrude in the same orientation of the axial direction A. Accordingly, the electrode assemblies 2 can be electrically connected to each other by arranging the bus bars 42 only on one side in the axial direction A. Thus, the number of man-hours for connecting the energy storage apparatuses 1 can be reduced.

Figure 16:
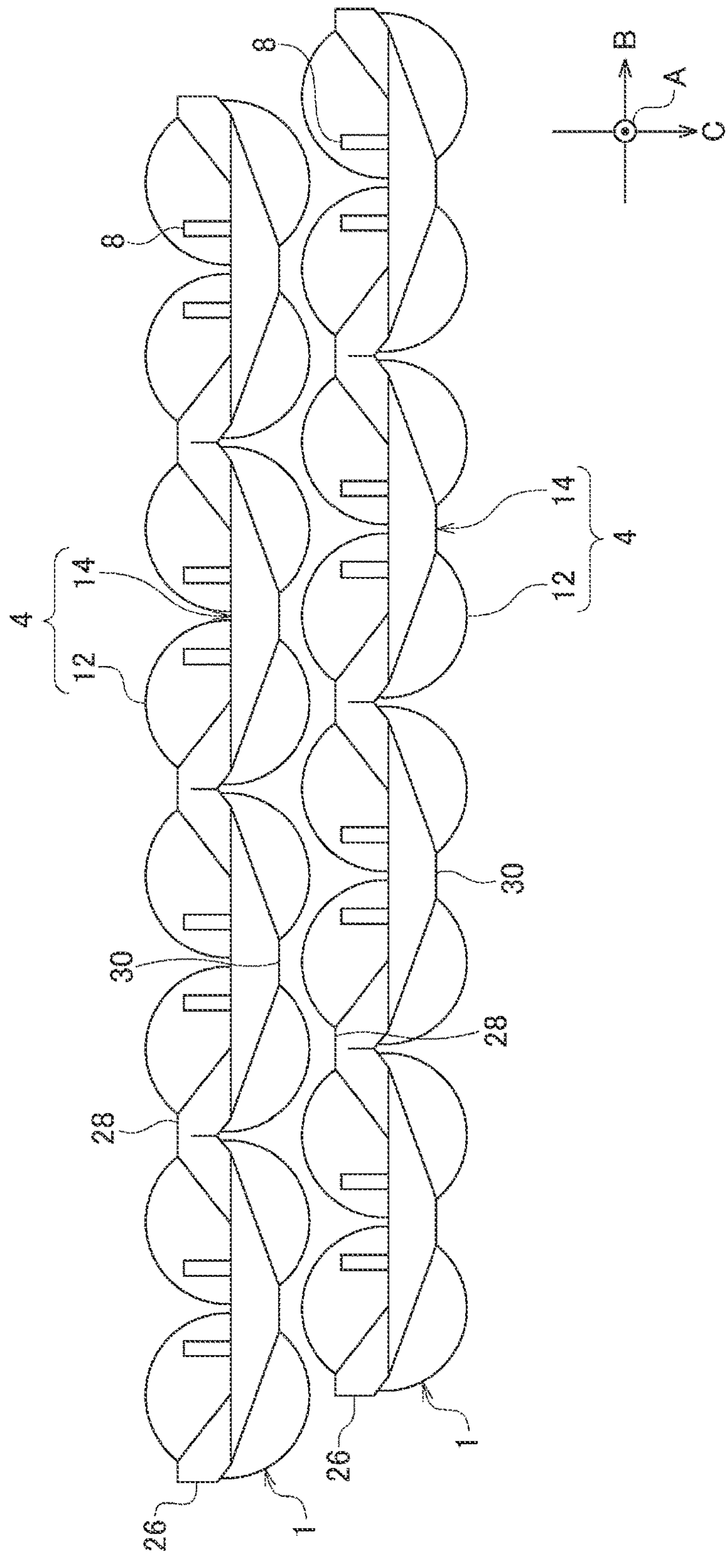
FIG. 16 is a view illustrating an arrangement mode of the plurality of energy storage apparatuses.

FIG. 16 is a view illustrating an arrangement mode of the plurality of energy storage apparatuses 1. In a case where the plurality of energy storage apparatuses 1 is combined to form an energy storage module, the plurality of energy storage apparatuses 1 is arranged in the orthogonal direction C as an example. The energy storage apparatuses 1 are set in posture such that the housing portions 12 are arranged in the same direction. The first electrode leads 8 of the energy storage apparatuses 1 are arranged so as to extend in the same orientation of the orthogonal direction C. The second electrode leads 10 are arranged similarly.

Adjacent two of the energy storage apparatuses 1 in the orthogonal direction C are arranged to be shifted from each other in the arrangement direction B such that, between the axes of adjacent two of the electrode assemblies 2 in one energy storage apparatus 1, the axis of one of the electrode assemblies 2 of the other energy storage apparatus 1 is located. That is, between the valley of two of the housing portions 12 of one energy storage apparatus 1, one of the housing portions 12 of the other energy storage apparatus 1 is fitted. Accordingly, the size of the energy storage module in the orthogonal direction C can be reduced. Although the two energy storage apparatuses 1 are illustrated in FIG. 16, the number of energy storage apparatuses 1 included in the energy storage module may be three or more. The two energy storage apparatuses 1 illustrated in FIG. 16 are set in posture such that the first electrode leads 8 protrude in the same orientation, but the first electrode leads 8 may be arranged so as to protrude in opposite directions to each other.

Figure 17:
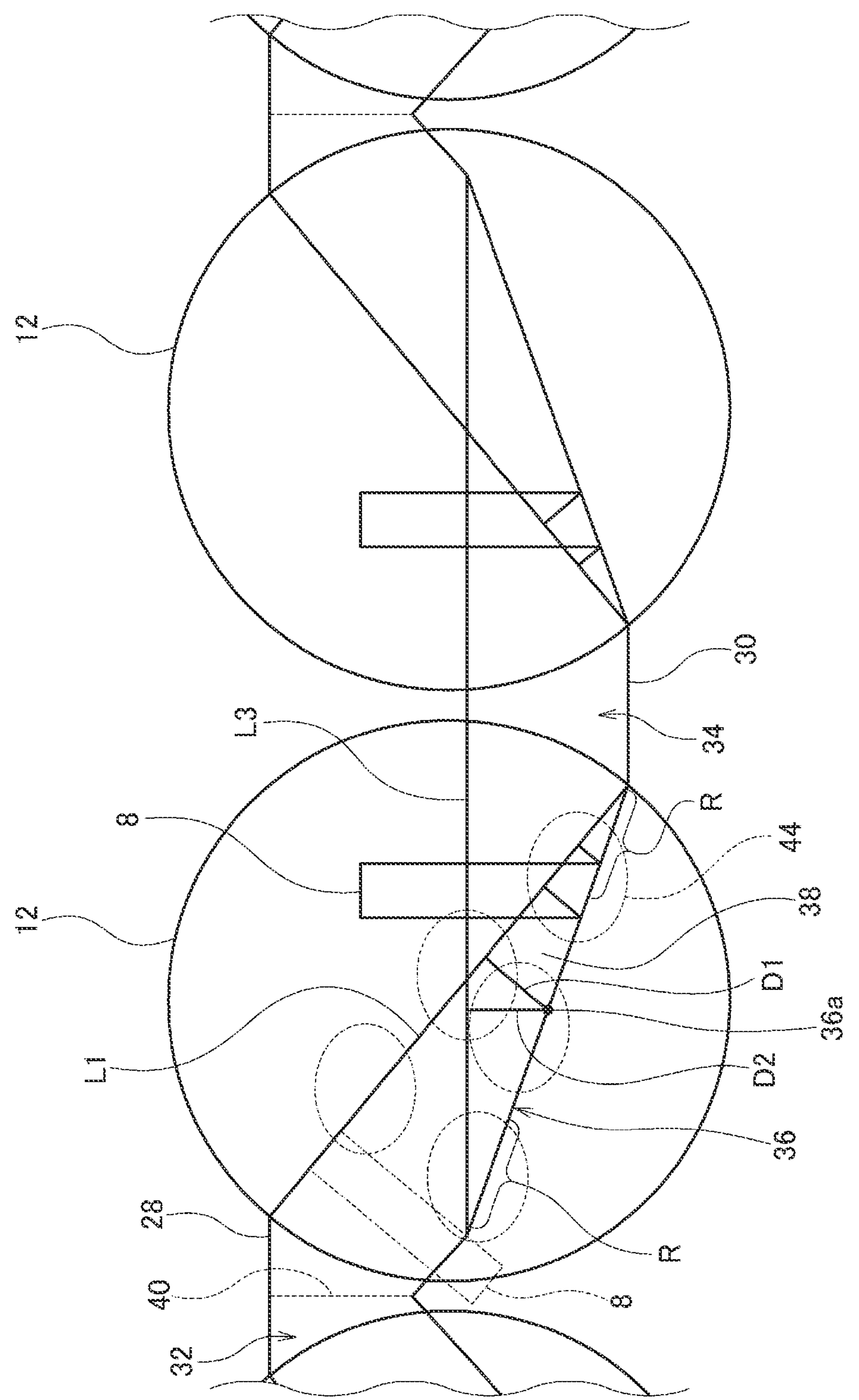
FIG. 17 is a schematic view illustrating arrangement of electrode leads.

FIG. 17 is a schematic view illustrating arrangement of electrode leads. Hereinafter, the arrangement of electrode leads will be described by taking the first electrode leads 8 as an example, but the second electrode leads 10 are arranged similarly. The first electrode leads 8 each are bent at the boundary line L1 between the first inclined portion 32 and the housing portion 12. The first electrode lead 8, in a case of passing through the overlapping portion 38, is also bent at the folded-back line 36. When the first electrode lead 8 is bent, the first electrode lead 8 and the outer edge 26 may be peeled off from the portion where the lead is bent, and a peeled portion 44 may be formed.

The peeled portion 44 is more likely to occur at a portion where the number of members to be laminated is larger. The portion where the first electrode lead 8 and the outer edge 26 overlap each other has a structure in which at least three members, specifically, the first electrode lead 8 and two laminating films are laminated. Thus, the peeled portion 44 is more easily formed than a portion where none of the first electrode lead 8 extends. Since the first electrode lead 8 is bent at two portions as described above, two peeled portions 44 may be formed along the protruding direction of the first electrode lead 8. In a case where the housing portion 12 and the outside of the film outer body 4 communicate with each other via the two peeled portions 44, a leakage path of the contents of the housing portion 12 is formed, and the sealing property of the sealing portion 14 is lost at the portion.

In contrast, as illustrated in FIG. 17, the first electrode leads 8 of the present embodiment are arranged so as to pass through a position shifted from middle points 36*a* of the folded-back lines 36 (connection portions) connecting the first inclined portions 32 and the second inclined portions 34. At the middle points 36*a* of the folded-back lines 36, a distance D1 from the boundary lines L1 to the folded-back lines 36 is approximately equal to a distance D2 from the folded-back lines 36 to the outermost sides L3 of the film outer body 4. Thus, if the first electrode lead 8 passed through the middle point 36*a*, the leakage path would be more likely to be formed by the two peeled portions 44 that might be formed along the first electrode lead 8. Thus, the arrangement of the first electrode leads 8 so as to be shifted from the middle points 36*a* of the folded-back lines 36 can suppress decrease in the sealing property of the electrode assemblies 2 due to folding of the outer edge 26.

In the folded-back line 36, a point closer to the second connector 30 with respect to the middle point 36*a* is farther from the outermost side L3. Accordingly, by making the position where the first electrode lead 8 passes through the folded-back line 36 closer to the second connector 30 with respect to the middle point 36*a*, the peeled portion 44 that may be formed around the folded-back line 36 can be farther from the outermost side L3. Thus, the formation of the leakage path can be suppressed. On the other hand, in the folded-back line 36, a point farther from the second connector 30 with respect to the middle point 36*a* is farther from the boundary line L1. Accordingly, by making the position where the first electrode lead 8 passes through the folded-back line 36 farther from the second connector 30 with respect to the middle point 36*a*, the peeled portion 44 formed around the boundary line L1 can be farther from the peeled portion 44 that may be formed around the folded-back line 36. Thus, the formation of the leakage path can be suppressed.

Preferably, the first electrode lead 8 is arranged such that at least a part thereof passes through an outer end region R among four regions obtained by equally dividing the folded-back line 36 (one quarter region from the outside). More preferably, the first electrode lead 8 is arranged such that entire first electrode lead 8 passes through the outer end region R. Accordingly, the peeled portion 44 that may be formed around the folded-back line 36 can be farther from the outermost side L3 or from the peeled portion 44 formed around the boundary line L1. Thus, the formation of the leakage path can be further suppressed. Alternatively, the first electrode lead 8 may be arranged so as to pass through the outside of the overlapping portion 38. In this case, the first electrode lead 8 is bent only at a position overlapping the boundary line L1. Accordingly, the formation of the leakage path can be further suppressed. The peeled portion 44 is not necessarily formed in the energy storage apparatus 1 of the present disclosure (there may be a case where the peeled portion is not formed).

Figure 18A:
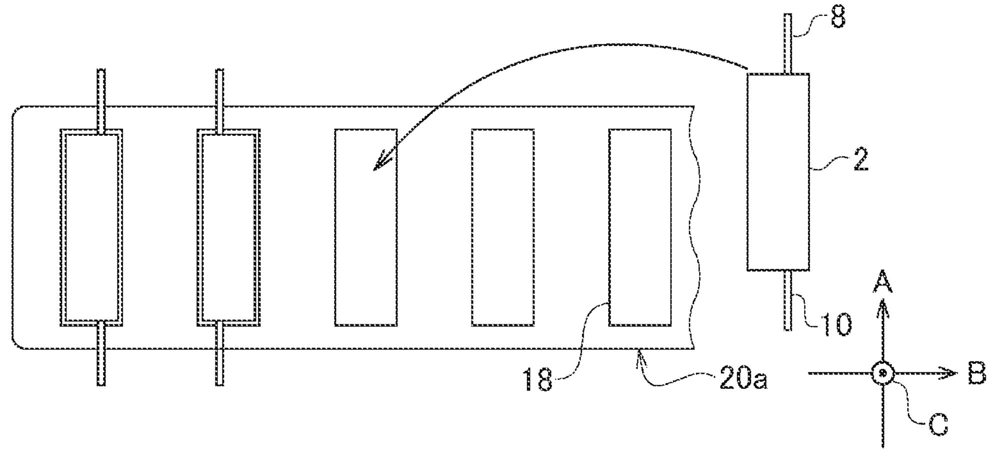
FIGS. 18A-18C are process diagrams of a method for manufacturing the energy storage apparatus.

Hereinafter, an example of a method for manufacturing the energy storage apparatus 1 will be described. FIGS. 18A to 18C and FIGS. 19A to 19C are process diagrams of the method for manufacturing the energy storage apparatus 1. First, as illustrated in FIG. 18A, a first laminating film 20*a* is prepared. A plurality of depressions 18 that are semi-cylindrical is formed in advance in the first laminating film 20*a*. The plurality of depressions 18 is formed, for example, by subjecting the first laminating film 20*a* to known treatment such as press working. One of the electrode assemblies 2 is set in each depression 18. The first electrode lead 8 and the second electrode lead 10 are connected to the electrode assembly 2 in advance. The first electrode lead 8 and the second electrode lead 10 are provided with sealant (not illustrated).

Figure 18B:
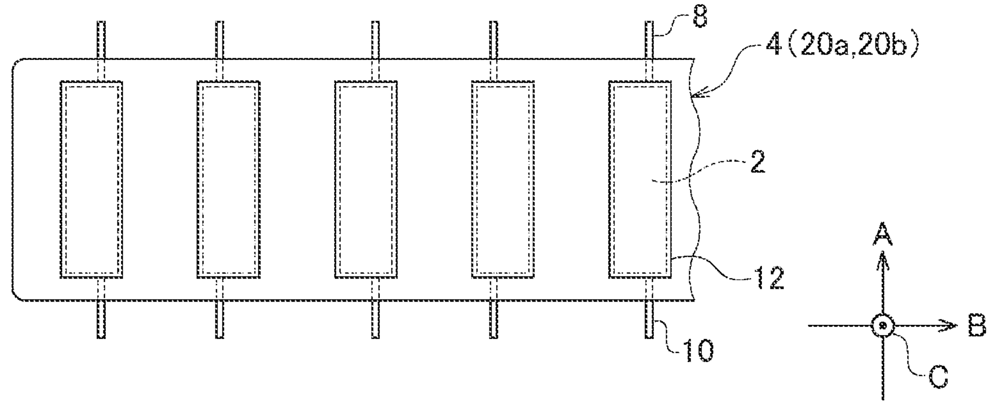

Then, as illustrated in FIG. 18B, a second laminating film 20*b* is made to overlap the first laminating film 20*a* to form the film outer body 4. The second laminating film 20*b* is provided with the depressions 18 that are semi-cylindrical at positions facing the depressions 18 of the first laminating film 20*a*. Accordingly, by making the first laminating film 20*a* and the second laminating film 20*b* overlap each other, the bag portions, in other words, the housing portions 12 are formed by pairs of depressions 18. The depressions 18 in the second laminating film 20*b* are formed by a method similar to the method for forming the depressions 18 in the first laminating film 20*a*. In a state where the electrode assemblies 2 are housed in the housing portions 12, the distal ends of the first electrode leads 8 and the distal ends of the second electrode leads 10 protrude to the outside of the film outer body 4.

Figure 18C:
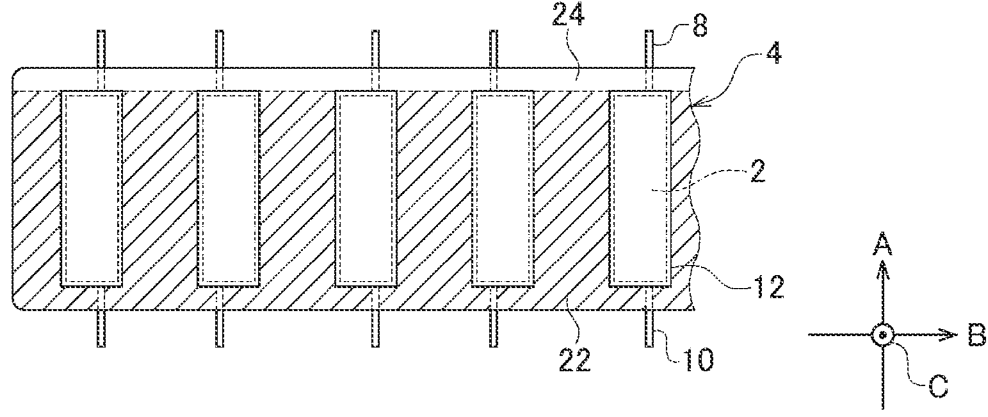

Then, as illustrated in FIG. 18C, a part of the film outer body 4 is subjected to the thermocompression bonding treatment to form a welded portion 22. A portion of the film outer body 4 that is not subjected to the thermocompression bonding treatment is a non-welded portion 24. The non-welded portion 24 is arranged so as to connect each housing portion 12 and the outside of the film outer body 4. In the present embodiment, the non-welded portion 24 is provided so as to connect the side from which the first electrode lead 8 protrudes among the four sides of each housing portion 12 and the outside of the film outer body 4. The other three sides of each housing portion 12 are surrounded by the welded portion 22. Boundary faces between the film outer body 4 and each second electrode lead 10 are sealed with sealant.

Figure 19A:
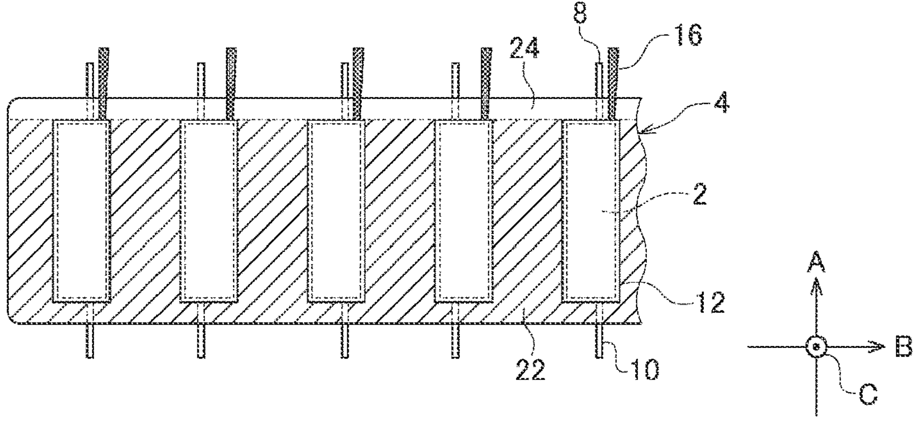
FIGS. 19A-19C are process diagrams of a method for manufacturing the energy storage apparatus.
Figure 19B:
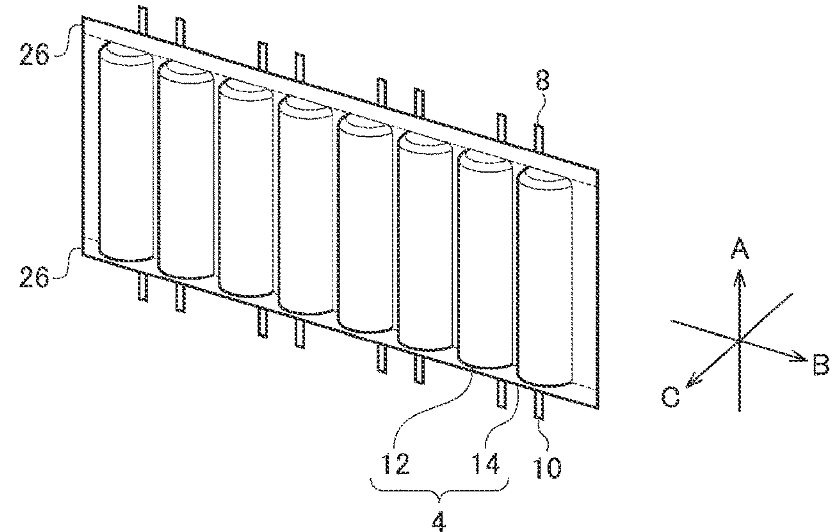
Figure 19C:
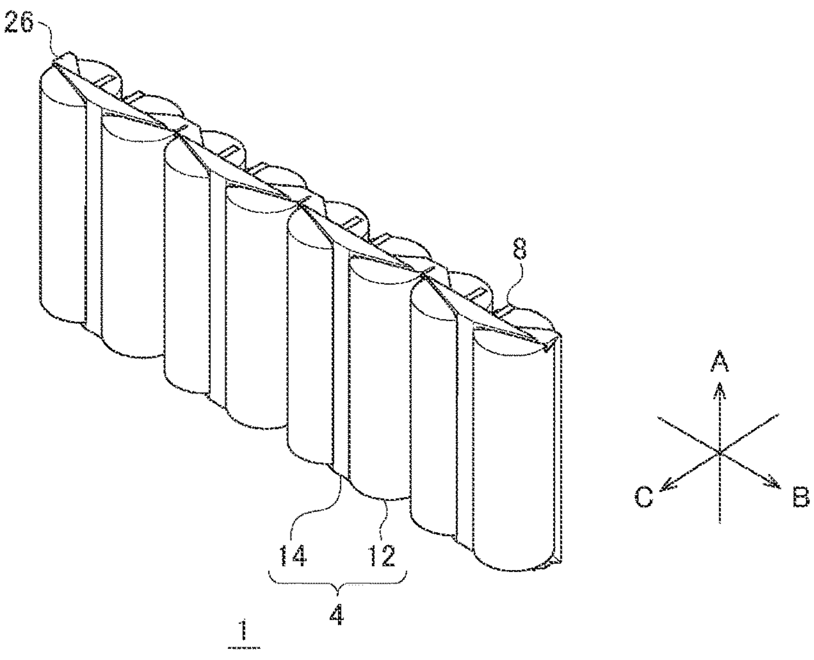

Then, as illustrated in FIG. 19A, the electrolytic solution 16 is injected into each of the housing portions 12 via the non-welded portion 24. After the injection of the electrolytic solution 16, as illustrated in FIG. 19B, the non-welded portion 24 is also subjected to the thermocompression bonding treatment. Consequently, the sealing portion 14 surrounding the entire circumference of each housing portion 12 is formed. Boundary faces between the film outer body 4 and each first electrode lead 8 are sealed with sealant. Then, as illustrated in FIG. 19C, the film outer body 4 is bent in a zigzag shape. Further, the outer edges 26 are folded. Through the above processes, the energy storage apparatus 1 is obtained. The outer edges 26 can be folded by, for example, applying a jig corresponding to the shape of the first inclined portion 32 from the side in the second orientation C2, applying a jig corresponding to the shape of the second inclined portion 34 from the side in the first orientation C1, and then pressing the outer edges 26 with a pressing machine.

Note that the method for manufacturing the energy storage apparatus 1 is not limited to the method described above. For example, the electrode assemblies 2 may be wrapped by folding one laminating film in half having a length twice as long as that of the energy storage apparatus 1. In a case where the required amount of the electrolytic solution 16 is small, the process of injecting the electrolytic solution 16 illustrated in FIG. 19A can be omitted by infiltrating the electrolytic solution 16 into the interelectrode separator in advance. In this case, in the thermocompression bonding treatment process illustrated in FIG. 18C, the entire circumference of each housing portion 12 is subjected to the thermocompression bonding treatment to form the sealing portion 14.

As described above, the energy storage apparatus 1 according to the present embodiment includes the plurality of electrode assemblies 2 that are cylindrical, and the film outer body 4 including the plurality of housing portions 12 that individually wrap the plurality of electrode assemblies 2, and the sealing portion 14 that seals each housing portion 12 and connects the plurality of housing portions 12 to each other. The film outer body 4 is bent between the housing portions 12 adjacent each other to meander in the arrangement direction B. The sealing portion 14 includes the first connectors 28 and the second connectors 30 that are arranged between adjacent two of the housing portions 12 and connect the two housing portions 12, and the outer edges 26 extending over the plurality of housing portions 12 on the outer side with respect to the housing portions 12 in the axial directions A of the electrode assemblies 2.

The first connectors 28 and the second connectors are alternately arranged in the arrangement direction B of the electrode assemblies 2, and extend in the arrangement direction B while being shifted from each other in the orthogonal direction C that is orthogonal to the axial direction A and the arrangement direction B. The outer edges 26 each include first inclined portions 32 and second inclined portions 34. The first inclined portions 32 each are continuous from the first connector 28 and the housing portions 12, are bent, with respect to the connection portions therewith, to the side of the second connectors 30 in the orthogonal direction C, and include a valley fold 40 fitted between the housing portions 12 adjacent each other. The second inclined portions 34 each are continuous from the second connector 30 and adjacent two of the first inclined portions 32 arranged with the second connector 30 interposed therebetween, and are bent, with respect to the connection portions therewith, to the side of the first connectors 28 in the orthogonal direction C. The first inclined portions 32 and the second inclined portions 34 overlap each other on the housing portions 12 as viewed from the axial direction A to form the overlapping portions 38.

In a case where the electrode assemblies 2 are individually housed in the plurality of housing portions 12, a large load may be applied to the sealing portion 14 due to generation of gas in the housing portion 12 or swelling of some of the electrode assemblies 2 caused by charging and discharging of the energy storage apparatus 1. When the sealing portion 14 is damaged and the inside of the housing portion 12 and the outside of the film outer body 4 are connected, the electrolytic solution 16 may leak to the outside of the film outer body 4. When the sealing portion 14 is damaged and the housing portions 12 adjacent each other are connected, the power generation performance of the energy storage apparatus 1 may be deteriorated due to, for examples, short-circuiting of the electrode assemblies 2 adjacent each other or deviation in the amount of the electrolytic solution 16 between the two housing portions 12.

Thus, in order to ensure the sealing property of the electrode assemblies 2, it is desired to increase the area of the sealing portion 14 to increase the strength of the sealing portion 14. However, enlarging the sealing portion 14 leads to upsizing of the energy storage apparatus 1. Upsizing the energy storage apparatus 1 leads to decrease in filling rate of the electrode assembly 2 in the energy storage module, that is, a decrease in energy density of the energy storage module 100. On the other hand, if the size of the sealing portion 14 is reduced to increase energy density of the energy storage module, the sealing property of the electrode assembly 2 is sacrificed.

In contrast, in the energy storage apparatus 1 of the present embodiment, the film outer body 4 is folded so as to meander in the arrangement direction B. Accordingly, it is possible to shorten an interval between the housing portions 12 adjacent each other and hence a length of the energy storage apparatus 1 in the arrangement direction B, without reducing the size of the sealing portion 14. In the energy storage apparatus 1 of the present embodiment, the outer edges 26 of the sealing portion 14 extending in the axial direction A to the outside of the housing portions 12 are inclined to the orthogonal direction C. Accordingly, the length of the energy storage apparatus 1 in the axial direction A can be smaller.

Further, while the outer edges 26 that meander in the arrangement direction B are inclined, the first inclined portions 32 and the second inclined portions 34 that are inclined in the orientations opposite to each other in the orthogonal direction C, are formed alternately in the arrangement direction B, and parts of both the inclined portions are made to overlap each other. The valley folds 40 are provided in the first inclined portions 32. Accordingly, fold lines, wrinkles, crooks, and the like generated when the outer edges 26 are folded are reduced as much as possible, so that it is possible to suppress the decrease in the sealing property of the electrode assemblies 2. Thus, according to the energy storage apparatus 1 of the present embodiment, it is possible to downsize the energy storage apparatus 1 while suppressing decrease in the sealing property of the electrode assemblies 2. This can improve the mounting efficiency of the energy storage apparatus 1, that is, the energy density of the energy storage module.

Since the energy storage apparatus 1 of the present embodiment has the pouch structure in which the plurality of electrode assemblies 2 is sealed with the film outer body 4 is adopted, the weight of the energy storage module can be reduced as compared with the case where the electrode assemblies 2 are individually sealed with the outer cans. Particularly in a case where the number of electrode assemblies 2 mounted in the energy storage module increases with an increase in capacity of the energy storage module, a remarkable weight reduction effect can be obtained.

In addition, the second inclined portions 34 of the present embodiment each have an isosceles trapezoidal shape including the connection portion with the second connector 30 as a base and the two folded-back lines 36 that are the connection portions connecting the first inclined portion 32 and the second inclined portion 34 as legs as viewed from the axial direction A. Accordingly, the total length of the fold lines generated by folding the outer edges 26 can be further shortened. Thus, it is possible to further suppress the decrease in the sealing property of the electrode assemblies 2.

The energy storage apparatus 1 of the present embodiment includes the first electrode leads 8 and the second electrode leads 10 having a strip shape that are electrically connected to the electrode assemblies 2 and protrude from the outer edges 26. Each of the electrode leads is arranged so as to pass through a position shifted from a middle point 36*a* of the folded-back line 36 that is the connection portion connecting the first inclined portion 32 and the second inclined portion 34. Further, each of the electrode leads is arranged such that, at least a part thereof passes through the outer end region R among four regions obtained by equally dividing the folded-back line 36, or through the outside of the overlapping portion 38. Accordingly, it is possible to further suppress the decrease in the sealing property of the electrode assemblies 2 due to the folding of the outer edges 26.

The embodiments of the present disclosure have been described above in detail. The above-described embodiments are merely specific examples for carrying out the present disclosure. The contents of the present embodiments do not limit the technical scope of the present disclosure, and many design changes such as modification, addition, and deletion of components can be made without departing from the spirit of the invention defined in the claims. A new embodiment obtained by making a design change has effects of both of embodiments and modifications that are combined. In the above-described embodiments, the contents that can be changed in design are emphasized with notations such as "of the present embodiment" and "in the present embodiment", but the design change may be made in the contents without such notations. Any combination of the components included in the embodiments is also effective as an aspect of the present disclosure. The hatching in the cross sections of the drawings does not limit the material of the hatched members.

The invention claimed is:

1. An energy storage apparatus comprising:

a plurality of electrode assemblies that are cylindrical; and a film outer body including a plurality of housing portions that individually wrap the plurality of electrode assemblies, and a sealing portion that seals each housing portion and connects the plurality of housing portions to each other, the film outer body being bent between the housing portions adjacent each other to meander in an arrangement direction of the electrode assemblies, wherein the sealing portion includes first connectors and second connectors that are arranged between adjacent two of the housing portions and connect the two of the housing portions, and an outer edge extending over the plurality of housing portions on an outer side with respect to the housing portions in an axial direction of the electrode assemblies, the first connectors and the second connectors are alternately arranged in the arrangement direction, and extend in the arrangement direction while being shifted from each other in an orthogonal direction that is orthogonal to the axial direction and the arrangement direction, the outer edge includes first inclined portions and second inclined portions, the first inclined portions each being continuous from one of the first connectors and the housing portions, that being bent, with respect to a connection portion between the one of the first connectors and the housing portions, to a side of the second connectors in the orthogonal direction, and that including a valley fold fitted between the housing portions adjacent each other, and the second inclined portions each being continuous from one of the second connectors and adjacent two of the first inclined portions arranged with the one of the second connectors interposed therebetween, and that being bent, with respect to a connection portion between the one of the second connector and the two of first inclined portions, to a side of the first connectors in the orthogonal direction, and the first inclined portions and the second inclined portions overlap each other on the housing portions as viewed from the axial direction to form overlapping portions.

2. The energy storage apparatus according to claim 1, wherein each of the second inclined portions has an isosceles trapezoidal shape including a connection portion with one of the second connectors as a base and two folded-back lines that are connection portions between one of the first inclined portions and one of the second inclined portions as legs as viewed from the axial direction.

3. The energy storage apparatus according to claim 1, further comprising an electrode lead having a strip shape that is electrically connected to each of the electrode assemblies and protrudes from the outer edge, wherein the electrode lead is arranged so as to pass through a position shifted from a middle point of a folded-back line that is one of the connection portions between one of the first inclined portions and one of the second inclined portions.

4. The energy storage apparatus according to claim 3, wherein the electrode lead is arranged to make at least a part thereof pass through an outer end region among four regions obtained by equally dividing the folded-back line, or through an outside of one of the overlapping portions.

* * * * *